US011768686B2

(12) United States Patent
Fetterman et al.

(10) Patent No.: US 11,768,686 B2
(45) Date of Patent: Sep. 26, 2023

(54) OUT OF ORDER MEMORY REQUEST TRACKING STRUCTURE AND TECHNIQUE

(71) Applicant: NVIDIA Corporation, Santa Clara, CA (US)

(72) Inventors: Michael A Fetterman, Lancaster, MA (US); Mark Gebhart, Round Rock, TX (US); Shirish Gadre, Fremont, CA (US); Mitchell Hayenga, Sunnyvale, CA (US); Steven Heinrich, Madison, AL (US); Ramesh Jandhyala, Austin, TX (US); Raghavan Madhavan, Cary, NC (US); Omkar Paranjape, Austin, TX (US); James Robertson, Austin, TX (US); Jeff Schottmiller, Raleigh, NC (US)

(73) Assignee: NVIDIA Corporation, Santa Clara, CA (US)

(*) Notice: Subject to any disclaimer, the term of this patent is extended or adjusted under 35 U.S.C. 154(b) by 41 days.

(21) Appl. No.: 16/940,363

(22) Filed: Jul. 27, 2020

(65) Prior Publication Data
US 2022/0027160 A1 Jan. 27, 2022

(51) Int. Cl.
*G06F 9/38* (2018.01)
*G06F 9/30* (2018.01)
*G06F 12/084* (2016.01)
*G06F 12/0873* (2016.01)
*G06F 9/54* (2006.01)
*G06F 12/0842* (2016.01)
*G06F 12/0846* (2016.01)
*G06F 5/06* (2006.01)

(52) U.S. Cl.
CPC ............ *G06F 9/3836* (2013.01); *G06F 5/065* (2013.01); *G06F 9/30047* (2013.01); *G06F 9/3867* (2013.01); *G06F 9/546* (2013.01); *G06F 12/084* (2013.01); *G06F 12/0842* (2013.01); *G06F 12/0846* (2013.01); *G06F 12/0873* (2013.01); *G06F 2212/1021* (2013.01)

(58) Field of Classification Search
None
See application file for complete search history.

(56) References Cited

U.S. PATENT DOCUMENTS

| 10,459,861 | B2 | 10/2019 | Qui et al. |
| 10,580,196 | B1 | 3/2020 | Muthler et al. |
| 2004/0210679 | A1* | 10/2004 | Clark .................... G06F 9/3836 710/5 |
| 2015/0095583 | A1* | 4/2015 | Pho ..................... G06F 12/0857 711/133 |

(Continued)

OTHER PUBLICATIONS

Patterson et al., "Computer Organization and Design: The Hardware/Software Interface", 2012, 793 pages, Elsevier, Inc.

*Primary Examiner* — Charles J Choi
(74) *Attorney, Agent, or Firm* — Nixon & Vanderhye P.C.

(57) ABSTRACT

In a streaming cache, multiple, dynamically sized tracking queues are employed. Request tracking information is distributed among the plural tracking queues to selectively enable out-of-order memory request returns. A dynamically controlled policy assigns pending requests to tracking queues, providing for example in-order memory returns in some contexts and/or for some traffic and out of order memory returns in other contexts and/or for other traffic.

36 Claims, 23 Drawing Sheets

(56) References Cited

U.S. PATENT DOCUMENTS

| | | | |
|---|---|---|---|
| 2016/0041868 A1* | 2/2016 | Davis | G06F 3/064 |
| | | | 714/773 |
| 2017/0317944 A1* | 11/2017 | John | H04L 67/02 |
| 2018/0322078 A1* | 11/2018 | Qiu | G06F 12/122 |

* cited by examiner

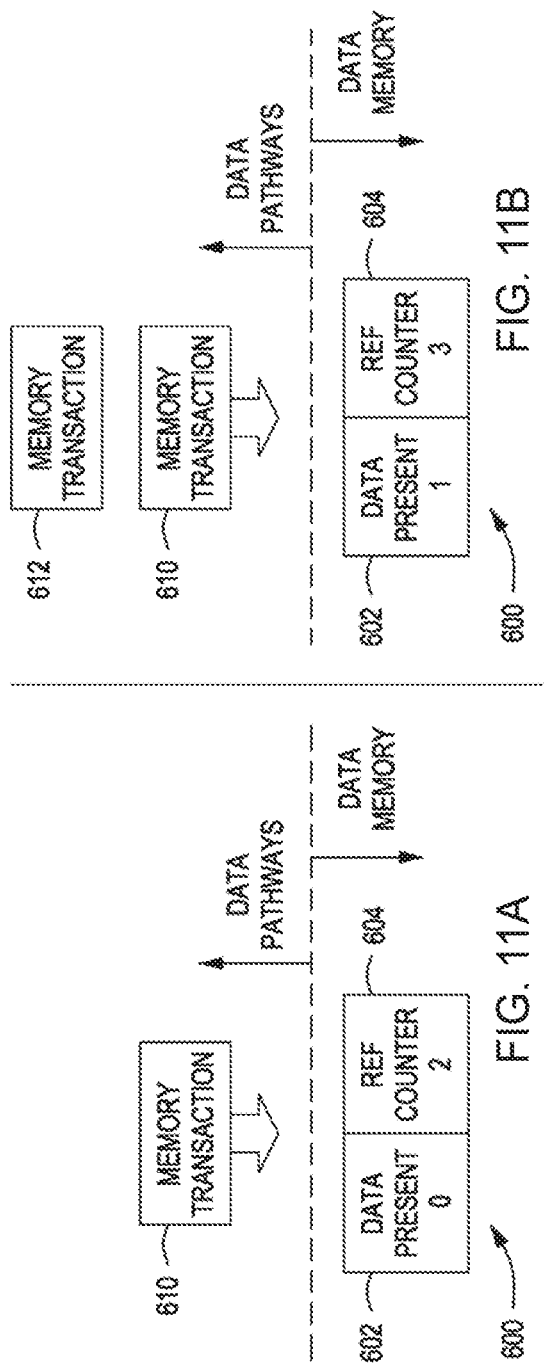
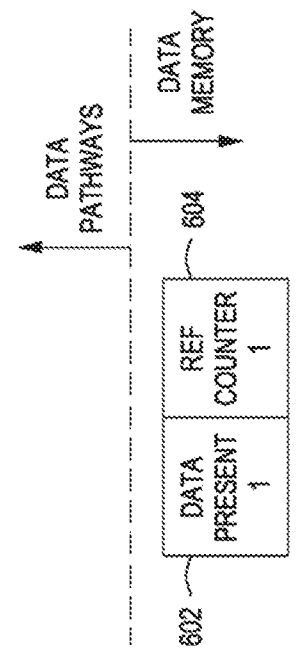
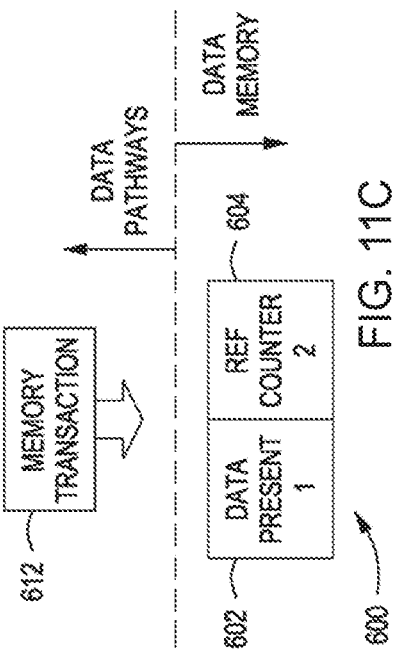
FIG. 11A
FIG. 11B
FIG. 11C
FIG. 11D

OUT OF ORDER MEMORY REQUEST TRACKING STRUCTURE AND TECHNIQUE

FIELD

The technology herein relates to streaming cache memories, and more particularly to a streaming cache memory comprising a memory request tracking structure having multiple tracking queues that allow memory requests to be tracked in or out of order.

BACKGROUND & SUMMARY

Graphics Processing Units (GPUs) workloads typically have very large working sets—typically on the order of hundreds of megabytes or more to generate a single image frame. It is not practical to provide sufficient on-chip cache memory capacity to store such large working sets. Furthermore, high performance massively parallel GPUs cannot afford to stall while waiting for missed data to become available—they need to be able to press ahead and process the data that is available (i.e., cache hits) even though other data (cache misses) is not yet available and is still being retrieved by the memory system.

Cache architectures that proceed with intermingled hits and misses are called streaming cache architectures. See e.g., Patterson et al, Computer Organization and Design: The Hardware/Software Interface, Appendix C (Nickolls et al, Graphics and Computing GPUs) (Elsevier 2012). Such streaming caches have been used in several GPU architectures in the past including NVIDIA's Volta and Turing architectures. See e.g., U.S. Pat. No. 10,459,861, of Qiu et al. entitled "Unified Cache For Diverse Memory Traffic", incorporated herein by reference.

In such architectures, the streaming multiprocessor (SM) Level 1 (L1) data cache comprises a streaming cache that serves as a bandwidth filter from the SM to the memory system. The unified cache subsystem the Qiu et al patent discloses includes a data memory configured as both a shared memory and a local cache memory. To process memory transactions that do not target shared memory, the unified cache subsystem includes a tag processing pipeline configured to identify cache hits and cache misses. When the tag processing pipeline identifies a cache miss for a given memory transaction, the transaction is pushed into a first-in first-out (FIFO) tracking queue until requested data is returned from L2 cache or external memory.

In such design, the first miss to occur would be resolved before the second miss, the second miss to occur would be resolved before the third miss, and so on—even though in some cases the memory system (e.g., L2 cache) might resolve later misses before earlier misses were resolved (e.g., by main memory). This implies that the latency to resolve a particular cache miss becomes the worst case latency to resolve any cache miss.

While traditional streaming cache designs often allowed only a small number of outstanding memory requests, the L1 cache in more advanced high performance GPUs such as NVIDIA Volta and NVIDIA Turing are designed to be latency tolerant and can have many outstanding memory requests (e.g., up to 1,024 independent outstanding requests as one example) in flight concurrently. Allowing a large number of concurrent outstanding memory requests helps avoid stalling the SM, which is massively parallel and concurrently executes many threads (e.g., in one embodiment, the SM executes between 32 and 64 independent warps each comprising 32 concurrent threads) all of which are sharing (and often competing for) the common L1 cache. Since the latency associated with L1 cache obtaining data from the L2 cache or main memory is relatively high, a tracking FIFO is used to hide the latency and the SM and its processes are designed to expect latency due to such cache misses and can do productive work while waiting for the missed data to be retrieved from the memory system. The memory request tracking structure is meanwhile used to keep track of all in-flight requests and schedule returns to the SM once all data needed for an operation has returned to the cache and the requesting process can continue executing.

Prior GPUs such as described above have tended to use a single FIFO as the memory request tracking structure, where only the oldest pending memory request is eligible to be processed each cycle. The single FIFO had the advantage of simplicity, less real estate and power consumption, and reduced bookkeeping in terms of matching up requests with returns. Furthermore, when filtering textures, designers typically choose to resolve multiple samples to a texture (on behalf of a single thread for a single texture query) in the same order every time, in order to avoid differences due to rounding errors when filtering (combining) the multiple samples into a single resultant color. For example, wavefronts within a single texture instruction are typically processed in order so that the filtering is done consistently. A single FIFO is often adequate for such workloads. However, a single FIFO can in some cases create head-of-line blocking that delays ready requests that are not at the head of the FIFO, preventing the system from taking advantage of parallelism within the design. Once the single FIFO is full, the L1 cache stops sending requests to the memory system, ultimately causing the SM to stall.

In more detail, the conceptual latency FIFO between L1's tag stage (T) and L1's data stage (D) is called the "T2D FIFO" (Tag-To-Data FIFO). Herein, "T2D" shall refer to such a tag-to-data FIFO. This conceptual T2D FIFO has a finite length, which has been 512 entries for some previous GPU designs but can be of any desired length. This FIFO is very wide in one embodiment—meaning that growing it may require significant chip area. The T2D FIFO is designed to cover the average L1 miss latency in order to prevent SM stalls.

Typically, all entries are pushed from L1Tag into the tail of the T2D FIFO. Each cycle, the hardware supporting the streaming cache checks the head of the FIFO to see if the data for the head entry is available in L1 Data. If the data is ready, the FIFO pops the head entry from the FIFO and sends it to L1Data to perform the data read.

The strictly in-order nature of this FIFO creates two issues:

Head of line blocking: Each cycle, the only entry available to pop from the FIFO is the head entry. If there are entries in the middle of the FIFO whose data is ready, they wait until all prior entries are popped—and then only once they reach the head of the FIFO are they eligible to be removed. This creates head-of-line blocking and increases the latency that the SM tolerates. This means that the average latency observed is close to the worst case L1 miss latency and the design does not see lower latency for operations that hit in the L2 cache. While such latency could be theoretically hidden if new requests were to be streamed continuously, this does not always happen in actual operation.

When the FIFO is full, L1Tag stalls: Whenever more entries than the length of the FIFO (e.g., 512 entries) are pending in the T2D, the L1Tag stalls. This prevents forward progress for all traffic in L1Tag including hits that normally would be able to bypass the T2D. It also prevents the memory system from servicing any new memory requests.

Thus, while single FIFO based memory request tracking structures for streaming caches have the advantage of simplicity and are often adequate for many applications (especially for traffic that needs to remain serialized) in latency tolerant GPU designs, it may be desirable to incur additional complexity to go even faster in cases where the constraints of a single FIFO impact efficiency and performance.

BRIEF DESCRIPTION OF THE DRAWINGS

Please refer to the following detailed description of example non-limiting embodiments in connection with the drawings, of which:

FIGS. 6-22 are as described in U.S. Pat. No. 10,459,861 of Qiu et al. entitled "Unified Cache For Diverse Memory Traffic", incorporated by reference.

DETAILED DESCRIPTION OF EXAMPLE NON-LIMITING EMBODIMENTS

The example non-limiting technology herein creates multiple tracking queues and allows the head of any of the tracking queues to be removed each cycle if it is ready. Rather than simply checking the head of the T2D each cycle, the GPU checks the head of all tracking queues and frees an entry from a ready tracking queue. One embodiment thus replaces or supplements prior single FIFO in-order tracking structures with an out-of-order tracking structure that increases performance with minimal hardware costs and no software changes required.

Such out-of-order tracking in one embodiment allows some types of requests (e.g., general compute load/stores and ray tracing acceleration data structure requests) to be processed out-of-order while being flexible enough to process other requests (e.g., texture data) in order, thus providing the ability to support both in-order and out-of-order memory request traffic streams. Meanwhile, example embodiments still allow for out of order memory request traffic streams across warps for any workloads such as texture workloads. The ability to exploit system-tolerable degrees of out-of-order memory accesses and associated executions can result in substantial performance and efficiency improvements. For example, out-of-order return processing can provide increased processing efficiencies of certain workload types within a warp that do not need to maintain in-order processing or in-order returns but can instead support out-of-order returns within the same warp.

Figure 1:
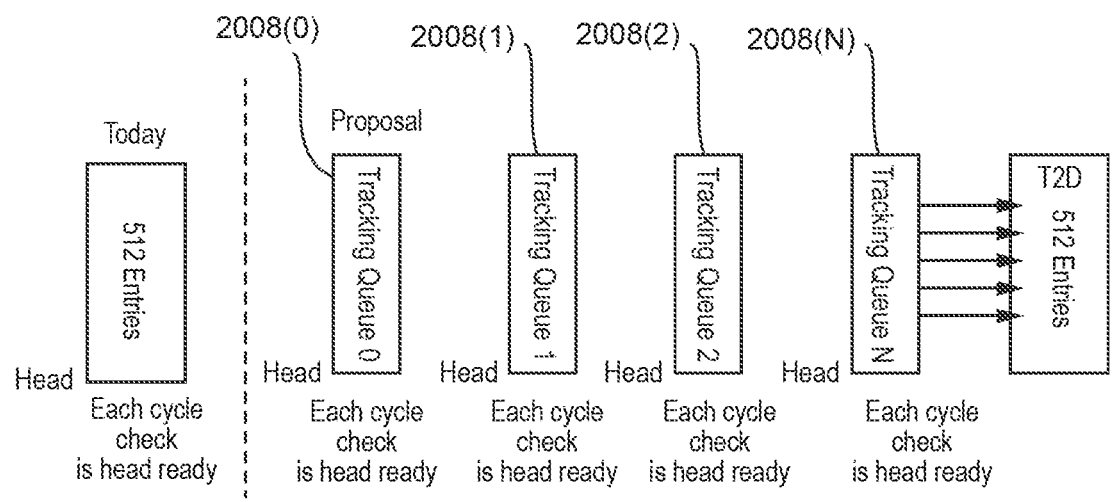
FIG. 1 schematically shows a contrast between a prior design and one example embodiment of a memory request tracking structure for a streaming cache.

FIG. 1 shows a contrast between a prior design (on the left labelled "Today") providing a single FIFO and a new design (on the right labelled "Proposal") providing N tracking queues where N>1. Rather than having a single FIFO to track all pending memory requests (or all pending requests for a particular type of workload) as shown on the left, one embodiment provides multiple (N) tracking queues where N is dynamically sized. One example non-limiting embodiment has N (e.g., 48) tracking queues, corresponding to the number N (e.g., 48) of warps the SM can execute concurrently. However, the number of tracking queues N can be any integer greater than one and need not match the number of warps. Furthermore, the number N can change from one design to the another depending on a number of factors such as the number of parallel warps that can be handled at one time, the mix of memory request traffic the system handles, the type and number of SM memory interfaces, the amount of chip area one would want to dedicate to this part of the design making a tradeoff between area and performance, and other factors. And the number k of the N tracking queues allocated to particular workload can be dynamically allocated as needed on a programming basis to provide in-order execution or any desired degree of out-of-order processing. For example, some workloads may need to be executed strictly in order, whereas other workloads can be executed in any order, and still other workloads may need to be executed in-order relative to a particular workgroup (e.g. warp) but can be executed out of order with respect to other workgroups (warps). One embodiment is sufficiently flexible to dynamically accommodate and enable any or all of these execution models.

In one embodiment, the N tracking queues each comprise a FIFO that stores pointers into a larger structure. Such arrangement allows for dynamic partitioning across the N tracking queues. One embodiment uses a dynamically controlled policy that assigns a pending request to a specific tracking queue. In one embodiment, the simplest policy assigns all work from the same warp to the same tracking queue. This provides in-order memory returns within a warp but out of order memory returns across warps. Since returns within a warp are still in order, no software changes are required to achieve the performance benefits. Additionally, since in one embodiment the requests within a warp drain in order, no additional accumulator precision or storage is needed to ensure arithmetic consistency for filtered texture operations and other requests. Furthermore, the assignment of requests to tracking queues can be dynamic and based on a number of factors. Some such assignments could result in nearly even distribution of requests across the N tracking queues, whereas other assignments could result in unequal distribution of work across the tracking queues, providing flexibility.

In particular, in embodiments herein, any work allocated to a particular tracking queue will be processed in order by that tracking queue. This feature can be leveraged to provide in-order servicing for workloads such as certain texture mapping processes that expect in-order returns and thus benefit from such in-order servicing. On the other hand, certain other types of workloads (e.g., ray tracing bounding volume hierarchy compressed treelet memory requests) may not need in-order servicing and could benefit from out-of-order servicing. In such cases, the out-of-order accesses can be distributed across the N tracking queues to reduce that chance that any individual long-latency access can block a significant number of other accesses and thus allow the ray tracer to make forward progress. See e.g., U.S. Pat. No. 10,580,196.

In one embodiment, during each cycle, the front entry of each of the N (e.g., 48) tracking queues is checked to see if the fill data is ready in the cache. In one embodiment, this checking is performed in parallel for each of the N tracking queues. As soon as any of the heads of the various tracking queues are determined to be ready, those entries can be removed from the tracking queues and sent to the SM, thereby unblocking those respective tracking queues.

In one embodiment, the ability to check all N (e.g., 48) queues each cycle is done with a tracking structure that stores which sectors each queue is waiting for. In one embodiment, this tracking structure is updated each cycle when a "GNIC fill" (see below) returns data to the L1 cache. In some cycles, multiple tracking queues will have ready entries. In one embodiment, a round robin arbiter is used to choose a ready tracking queue. Once a ready entry has been selected, this entry is removed from the tracking structure, the request is processed in the cache, and the data is sent back to the SM.

Example non-limiting novel aspects of this design include:

Dynamically sized tracking queues: Rather than having fixed capacities for each tracking queue, one example design uses three different storage tables that are traversed using a series of linked list pointers, allowing for dynamic capacity across the tracking queues. If only one queue is active, it can allocate all storage in the tracking structure. If all N (e.g., 48) queues are active, they each can allocate some portion of the tracking structure. This scheme allows the maximum number of memory requests to always be in-flight regardless of how many tracking queues are active.

Dynamically configurable queue mapping policies for different traffic classes: One embodiment has a dynamic runtime decision policy that controls the queue mapping policy. This allows different mapping decisions to be made for different kinds of memory access requests (e.g. Local/Global ("L/G") memory transaction traffic vs Texture/Surface ("Tex/Surf") traffic vs tree traversal unit (TTU) traffic, or other). Local/Global, Texture/Surface and TTU traffic are in this context different memory traffic classes that have different tracking and ordering requirements. For example, Local/Global traffic relates to loads from local or global memory; texture/surface traffic relates accessing data stored in (e.g., texture or shared) memory used (typically by shaders) for rendering textures and/or surfaces; and TTU traffic relates to memory accesses originated by a hardware based "tree traversal unit" (TTU) to traverse an acceleration data structure (ADS) such as a bounded volume hierarchy (BVH) for e.g., ray tracing. Different workloads will see different performance for these different policies and the dynamic control allows for runtime optimization. In one embodiment, TTU requests from a single warp are mapped across all tracking queues, maximizing the amount of out of order returns for TTU traffic, which does not have to be serviced in order. In one embodiment, Local/Global requests from a single warp map to the same tracking queue; other embodiments may map Local/Global requests from a single warp across multiple tracking queues.

Support for ordering across global events: In one embodiment, the L1 cache also processes events such as texture header/sample state update packets and data slot reference counter clear tokens events. In particular, as explained in U.S. Pat. No. 10,459,861 in connection with FIGS. 11A-11D and reference counter clear tokens events, in one embodiment, if ref counter 604 saturates to a maximum value data memory 430 then creates a copy of data slot 600 to handle future memory transactions and/or ref counter 604 locks to the maximum value and does not increment or decrement. When the tag in tag memory 414 associated with data slot 600 is subsequently evicted, a token with a pointer to data slot 600 is pushed onto evict FIFO 424 and scheduled for eviction. Upon being dequeued, the evict FIFO 424 detects that the data slot 600 is saturated and then enqueues a token with a pointer to the data slot to t2d FIFO 420. Upon the token reaching the head of t2d FIFO 420, ref counter 604 in data slot 600 is reset to 0.

These events create global ordering requirements across all inflight requests (not just requests within a single warp). One embodiment augments the ordering requirements across the tracking queues to functionally handle these global ordering requirements with minimal performance impact.

Support for in-order vs out of order allocation in tracking structures: In one embodiment, the storage structures that hold the tracking information are allocated and deallocated in-order, while requests are processed from these structures out of order. It is possible to simulate and quantify the impact of allocating and deallocating these structures out of order, a feature of other embodiments.

Support for different granularity of work items based on different traffic classes: Different traffic classes may need different granularity of items to be released from the tracking structure atomically. For texture operations that may need filtering in the TEX DF pipe, one embodiment releases all requests from the tracking structure for an entire instruction together. Releasing entries from T2D to send to L1Data at instruction granularity allows downstream stages such as dstage/fstage to continue working on instruction granularity units of work. For other operations, such as Local/Global or TTU instructions, one embodiment may release only a single wavefront (a schedulable unit created by grouping multiple execution threads such as 64 threads together) at a time. Instructions that generate a large number of wavefronts are handled with a special mechanism in one embodiment.

In one embodiment, each of the N tracking queues contain pointers to entries in the T2D where the data for a T2D packet is stored in the same way as prior in-order design. In one embodiment, a tracking queue is a linked list of pointers so that each tracking queue can have a dynamic capacity between 1 and N (e.g., 512) entries.

One embodiment exploits out of order across warps while maintaining all operations within a warp in program order. This simplification avoids software changes such as instruction execution ordering assignments and still captures the bulk of the possible performance benefit. Other architectures and embodiments might consider going out of order with a warp.

One embodiment performs in-order T2D allocation/deallocation meaning that entries can be removed from arbitrary locations in the T2D but their storage can't be reclaimed until they reach the head of the T2D. This simplification is done to reduce design effort at a cost to performance gain. Other tradeoffs are possible in other embodiments.

Feature Microarchitecture Design Details

Figure 2:
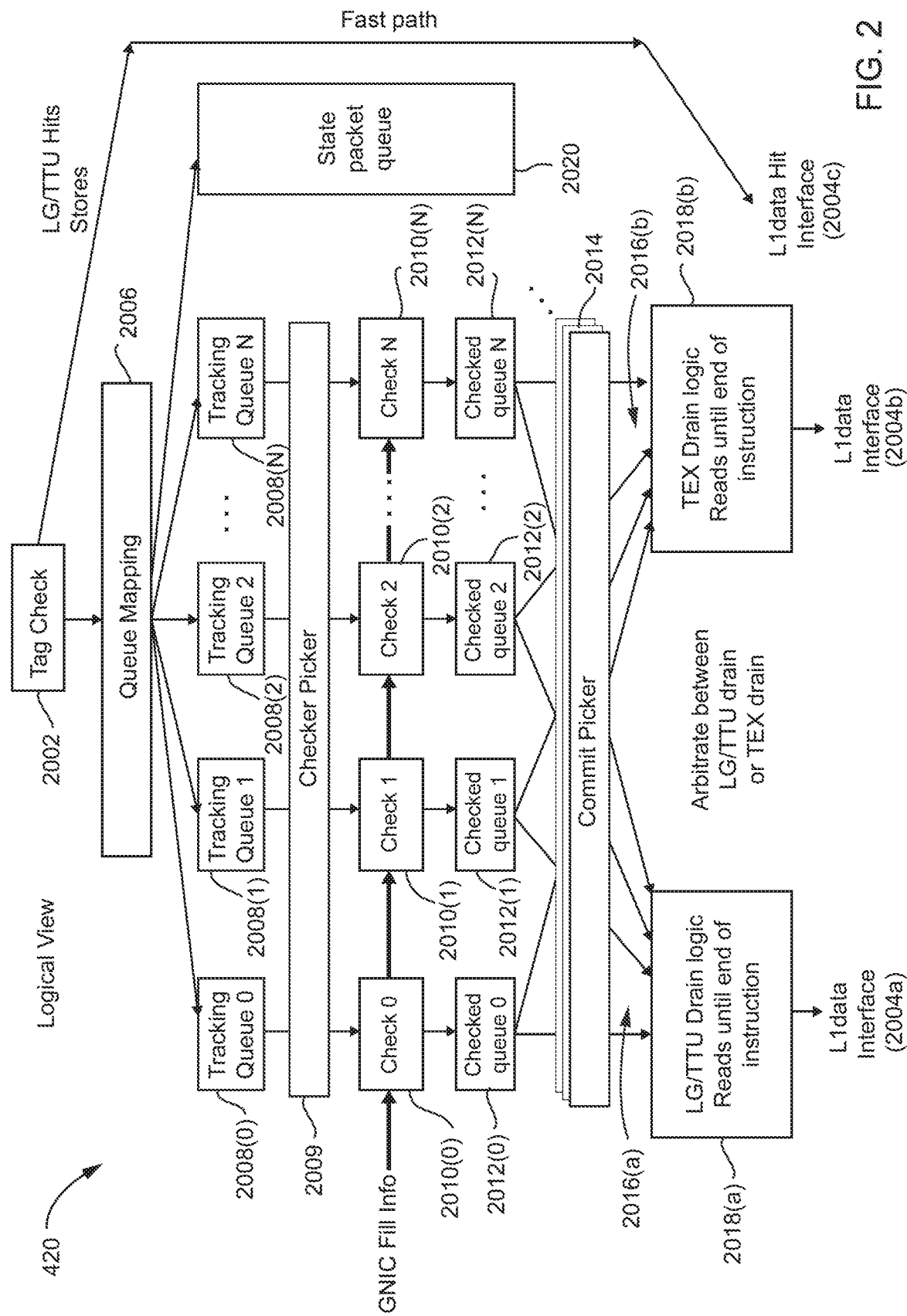
FIG. 2 is a schematic diagram showing a logical architecture of one embodiment of a memory request tracking structure for a streaming cache.
Figure 9:
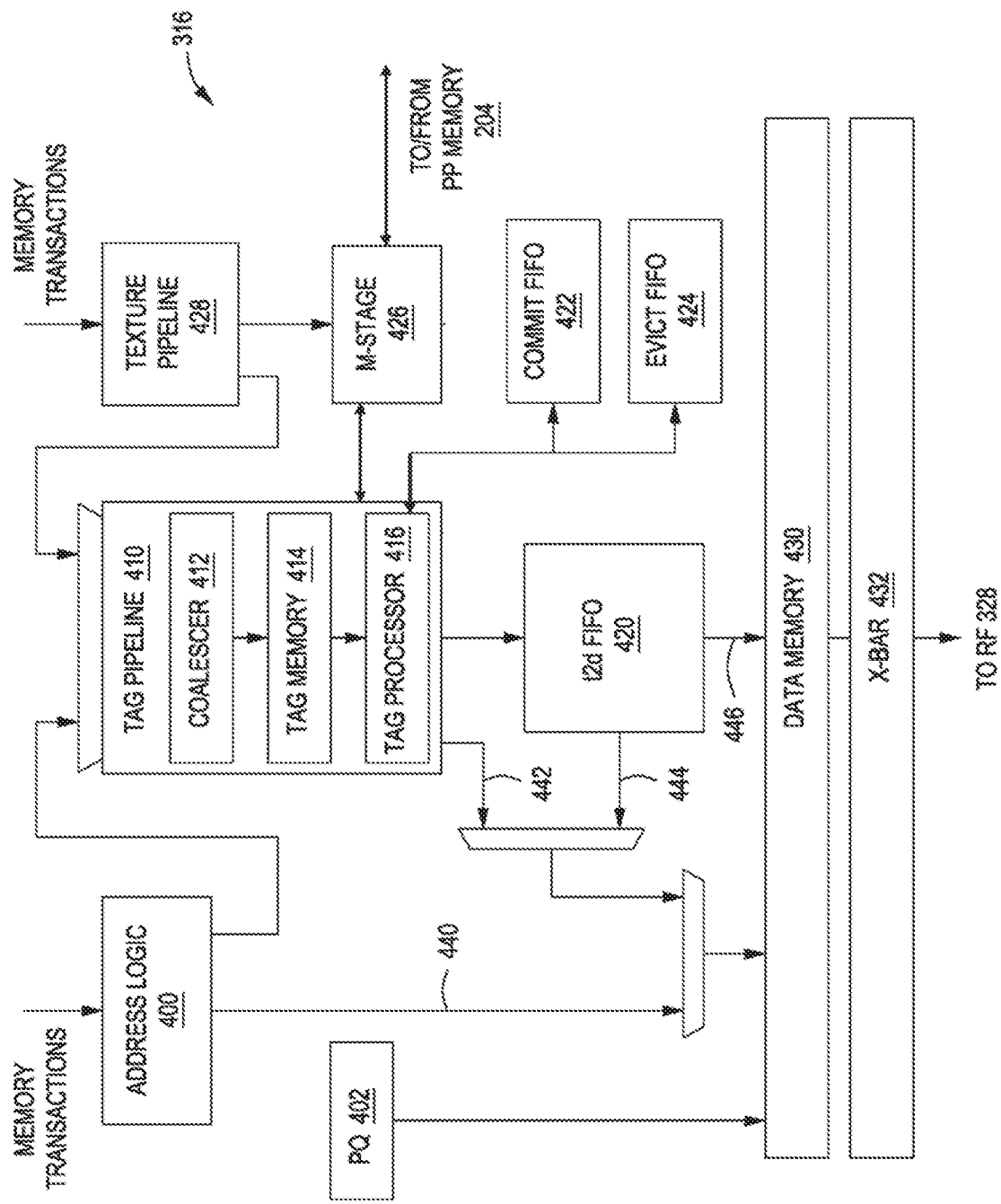
Figure 10:
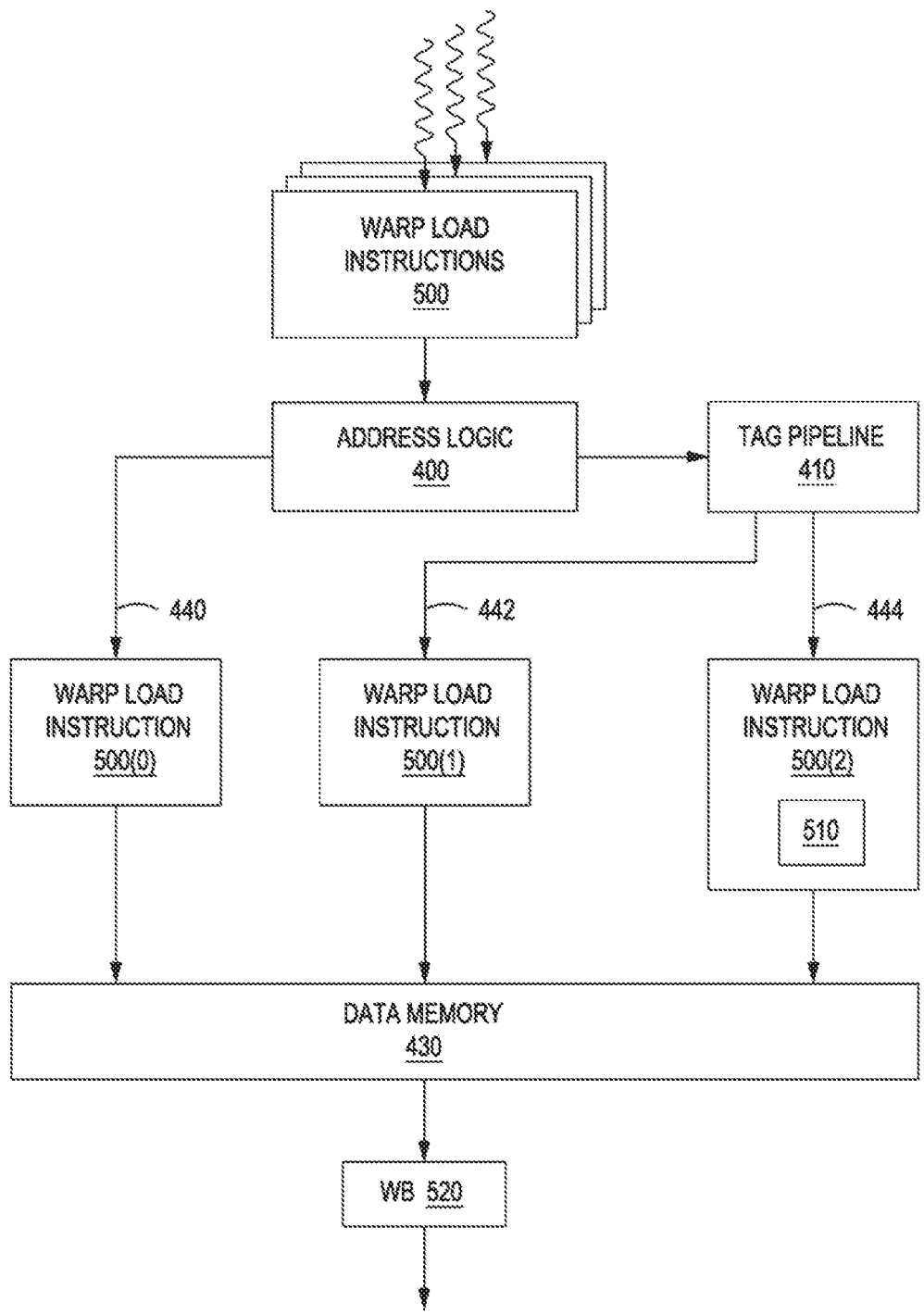
Figure 12:
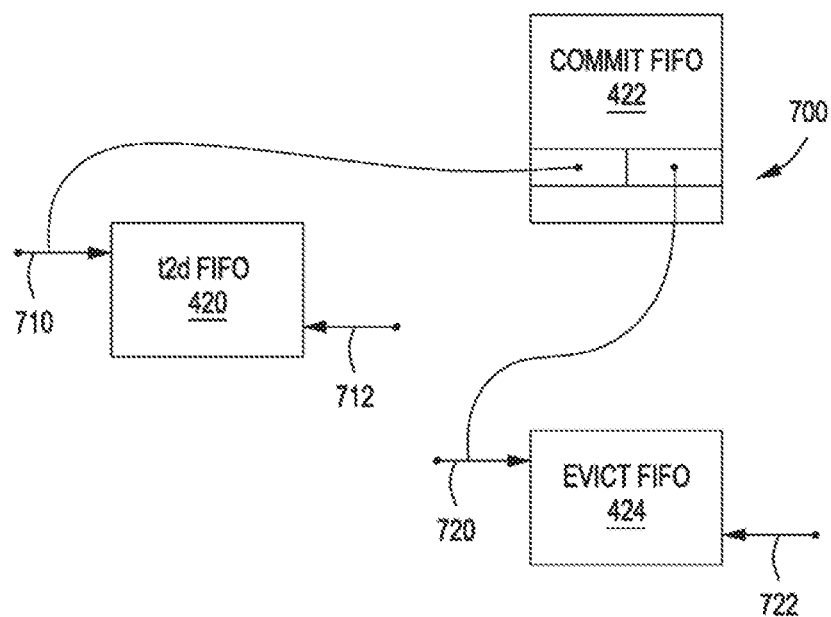
Figure 13A:
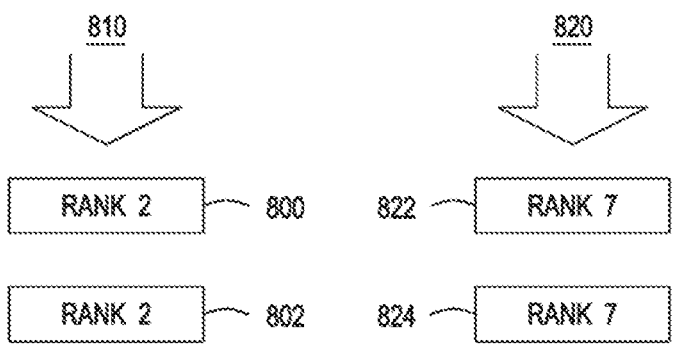
Figure 13B:
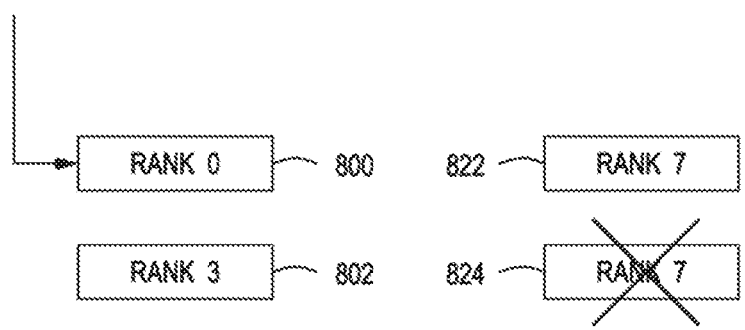
Figure 14:
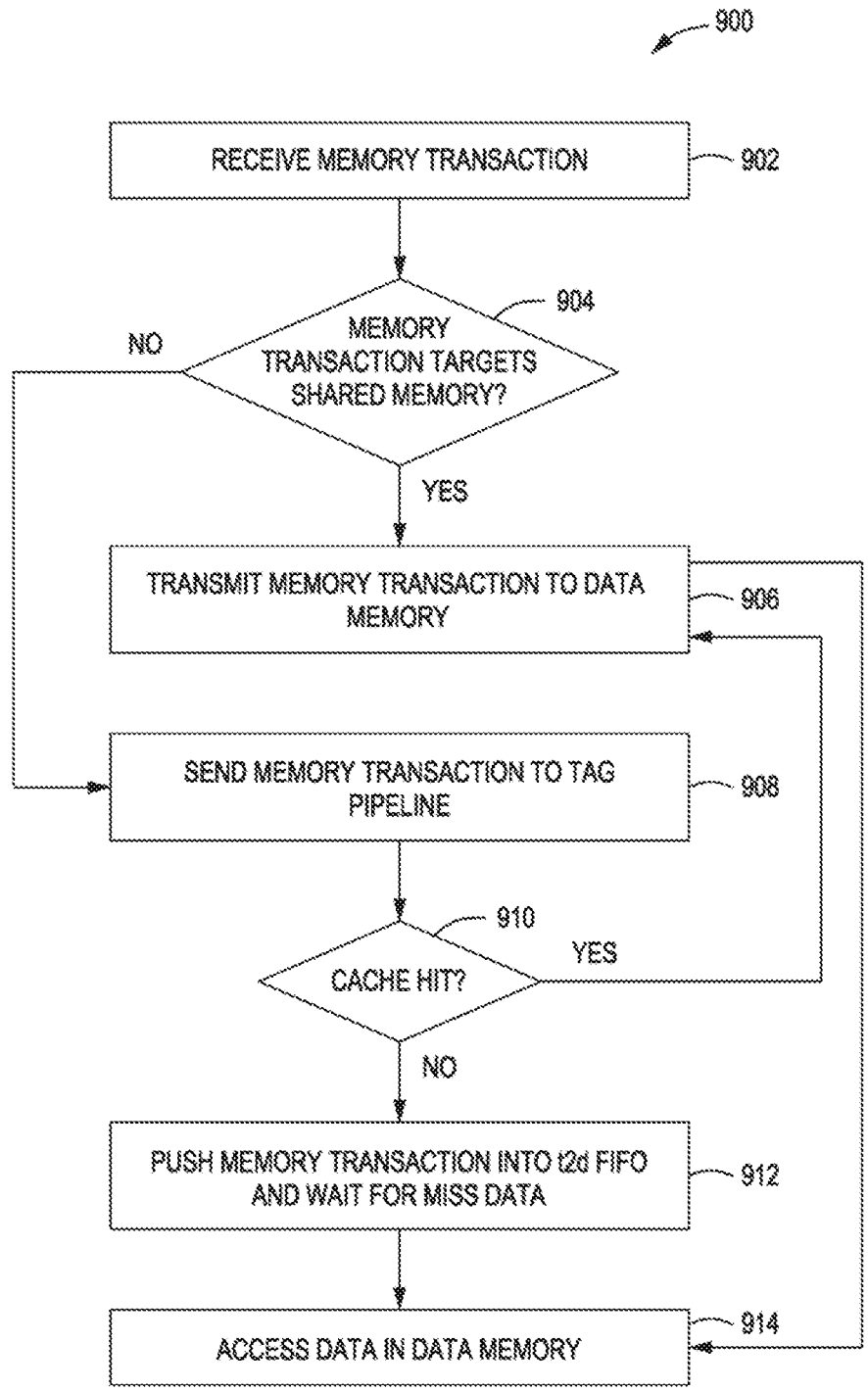
Figure 15:
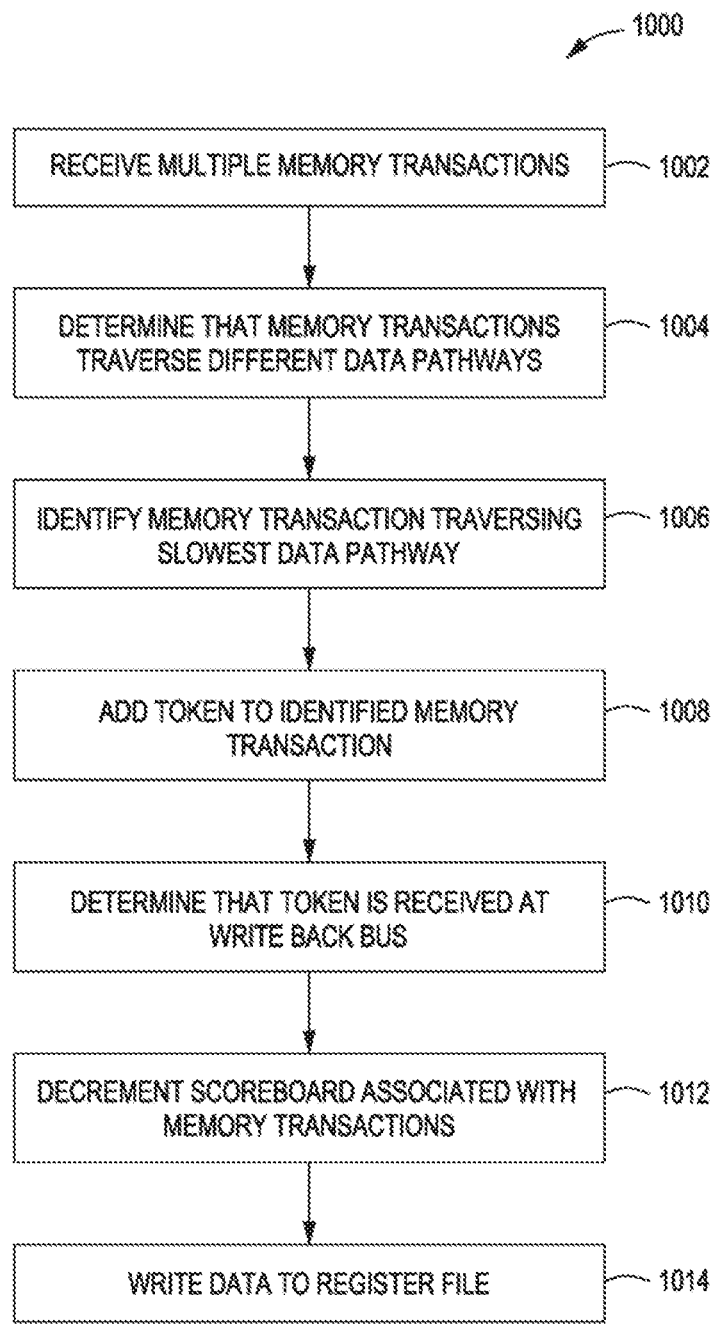
Figure 16:
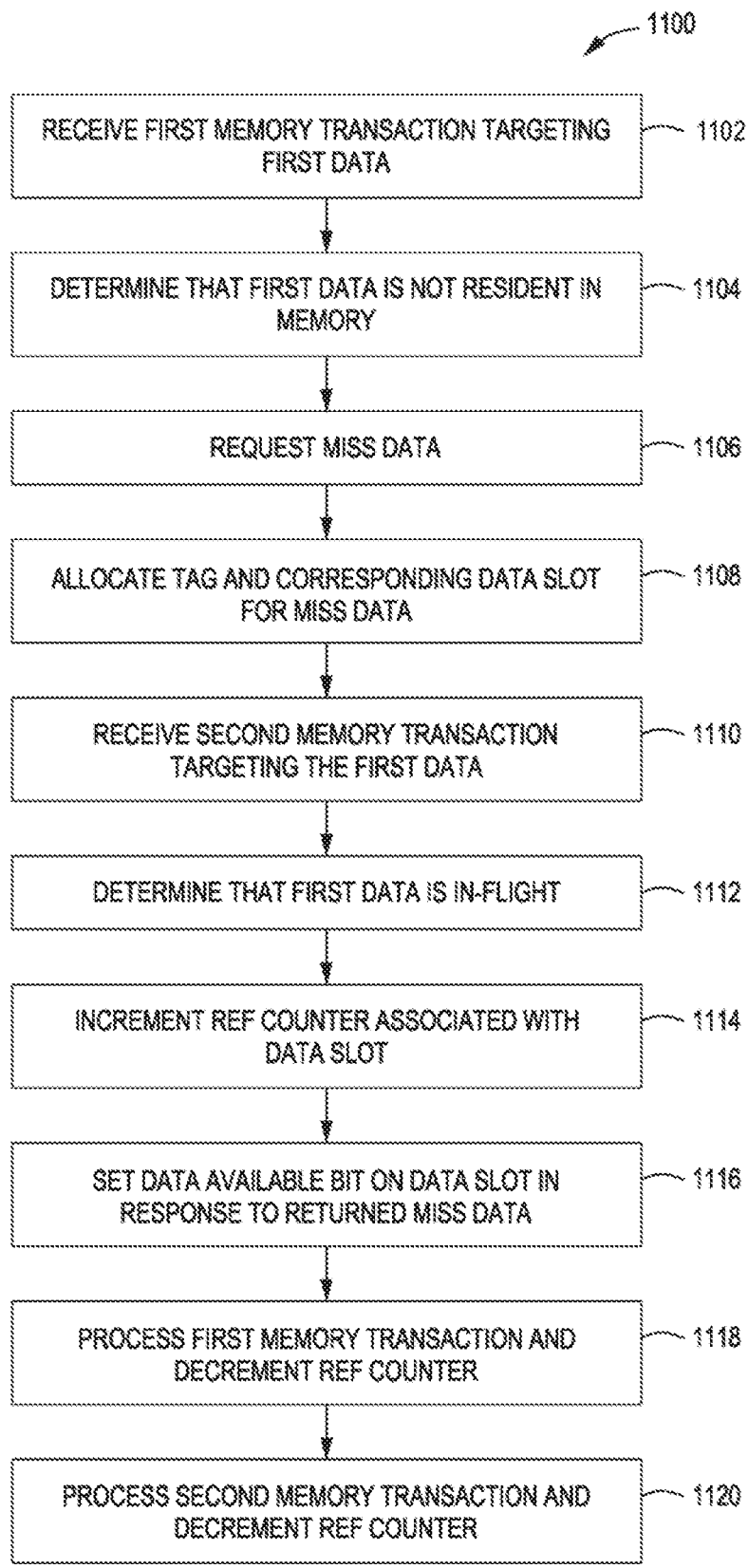
Figure 17:
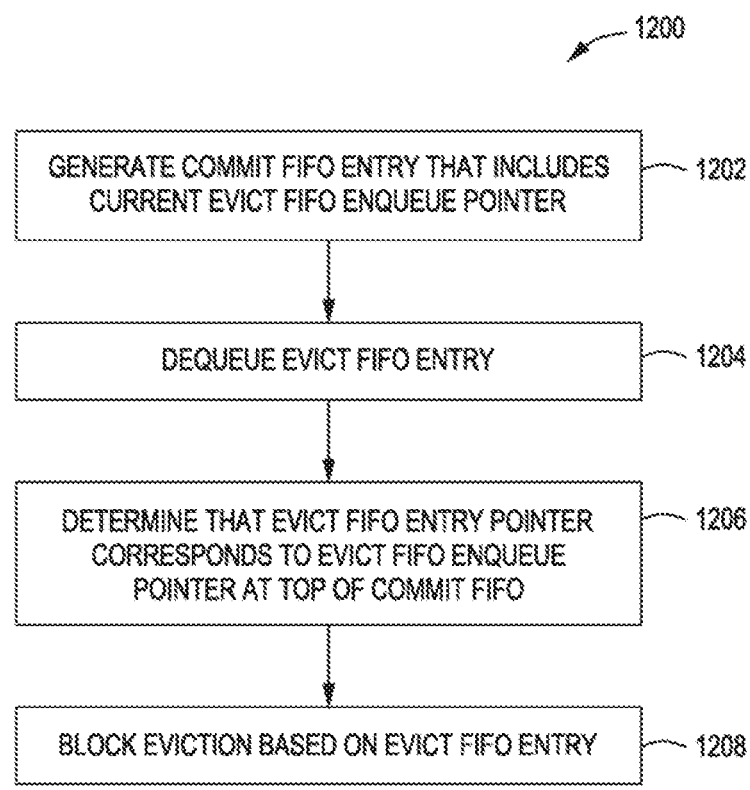
Figure 18:
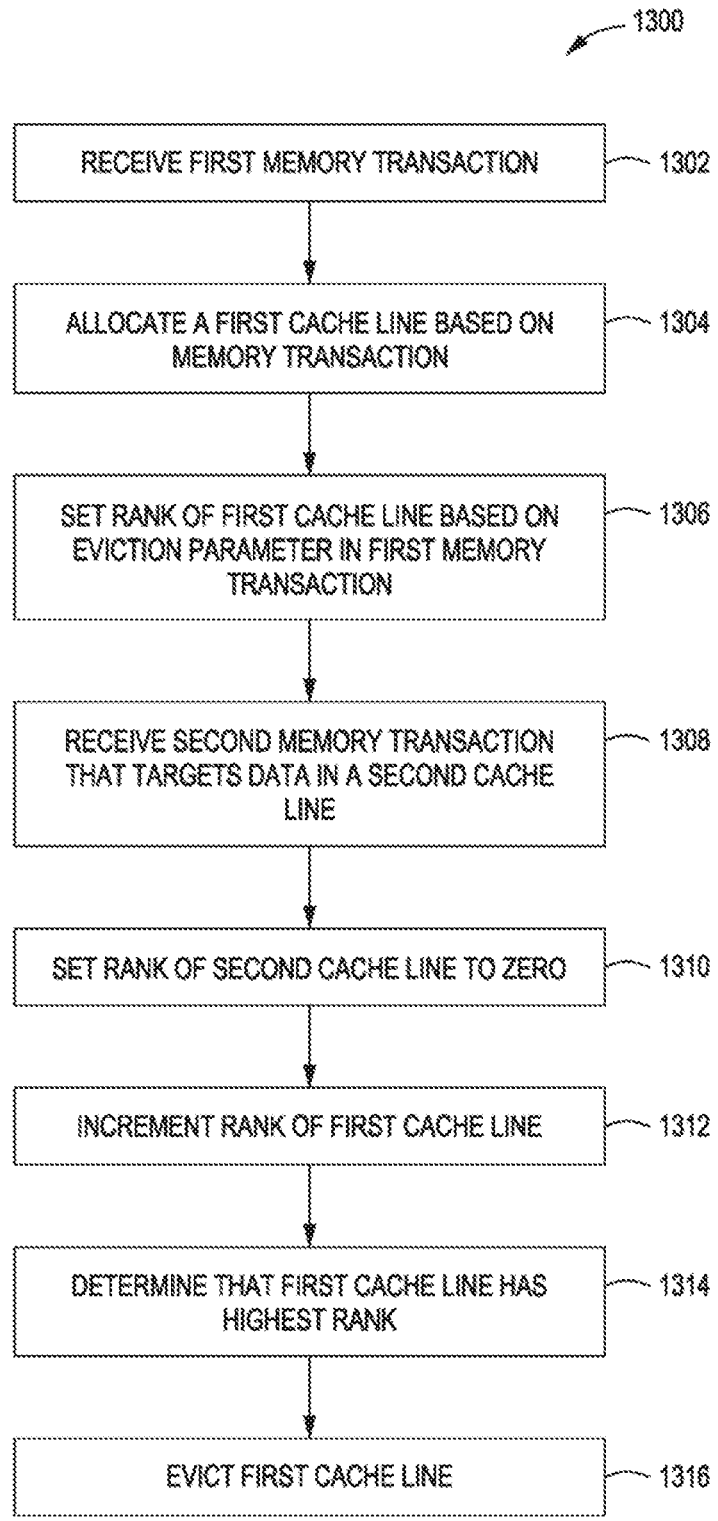
Figure 19:
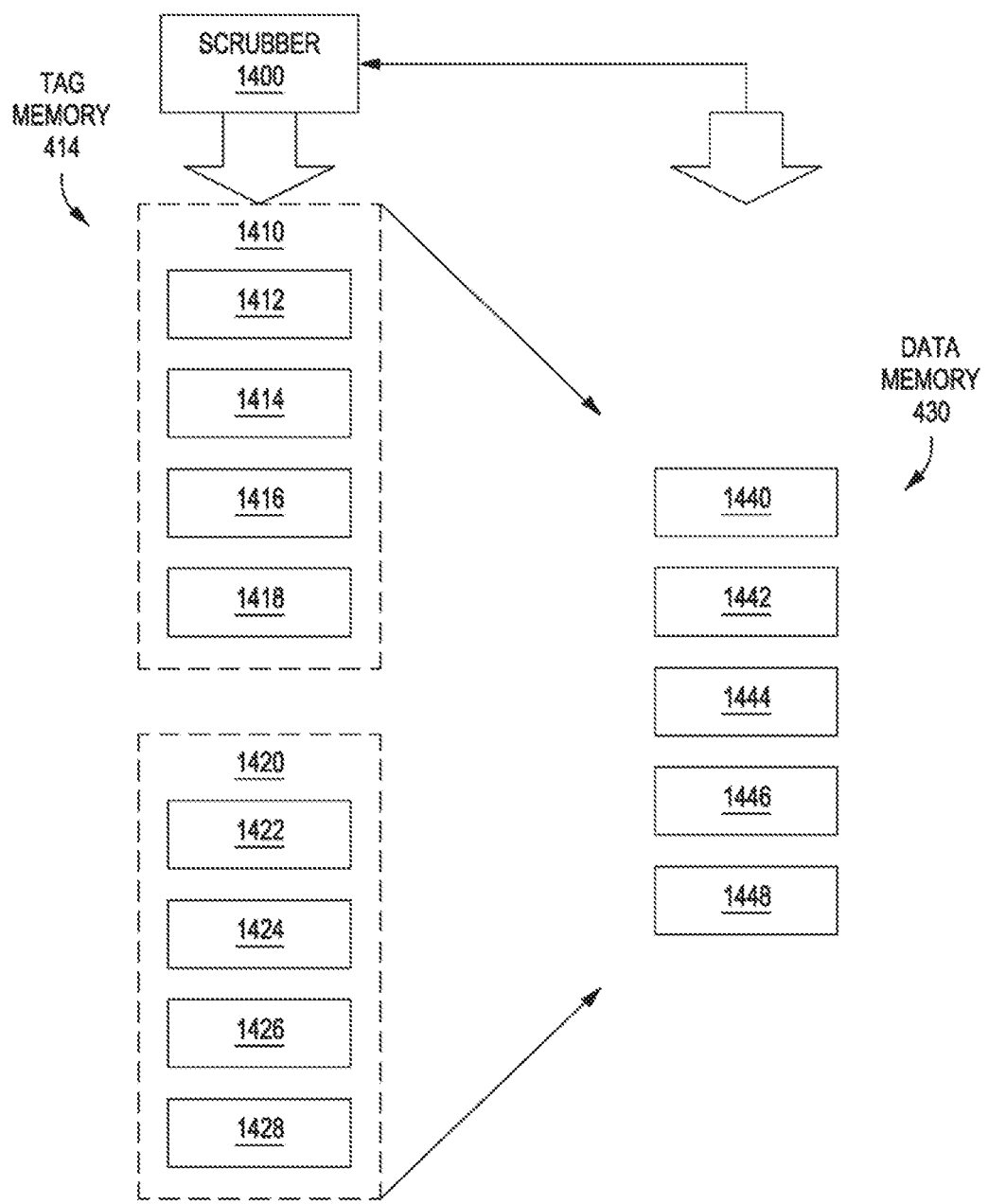
Figure 20:
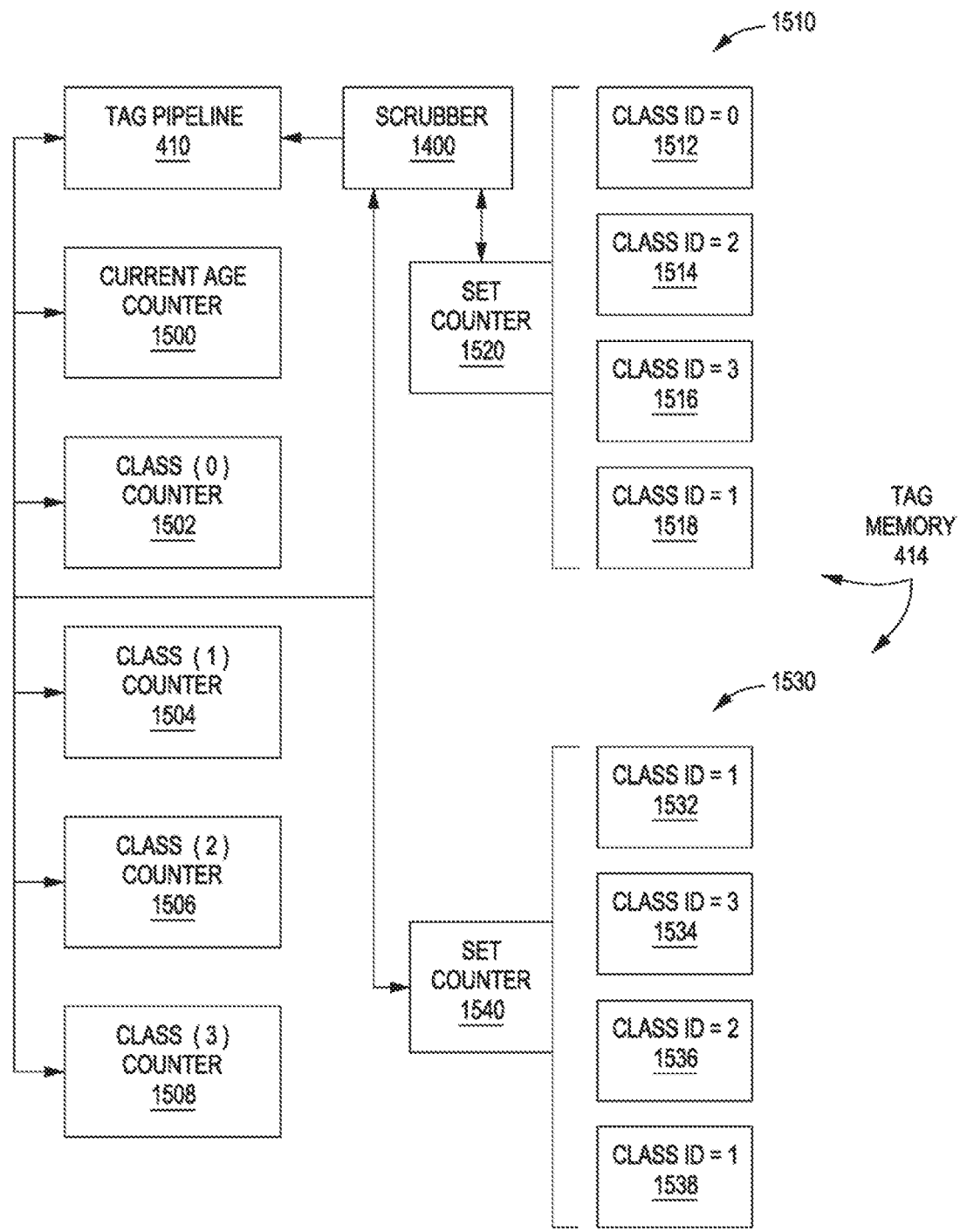
Figure 21:
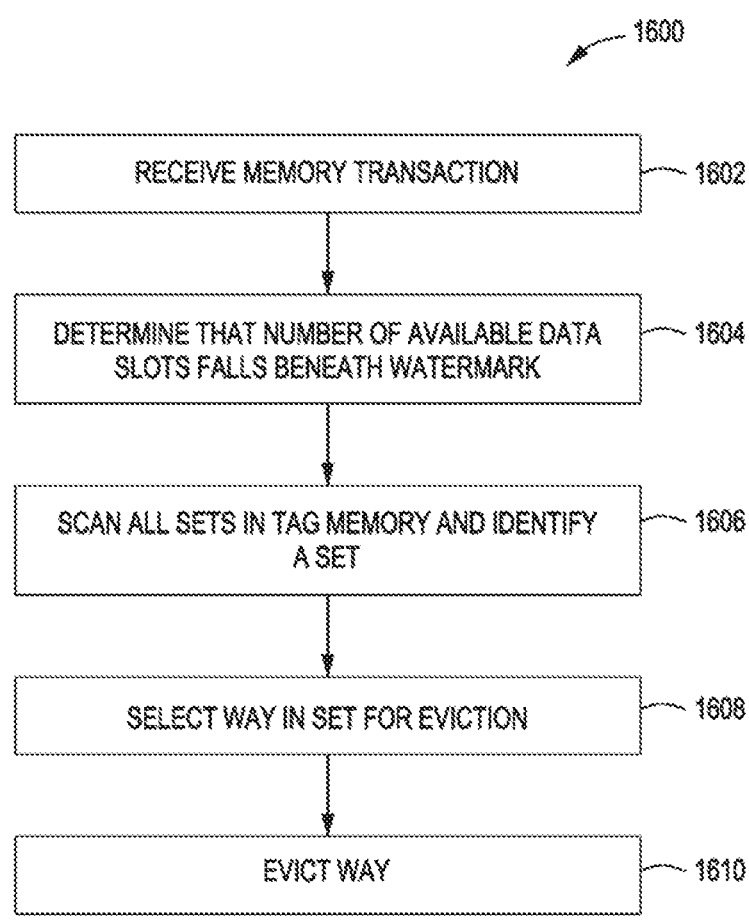
Figure 22:
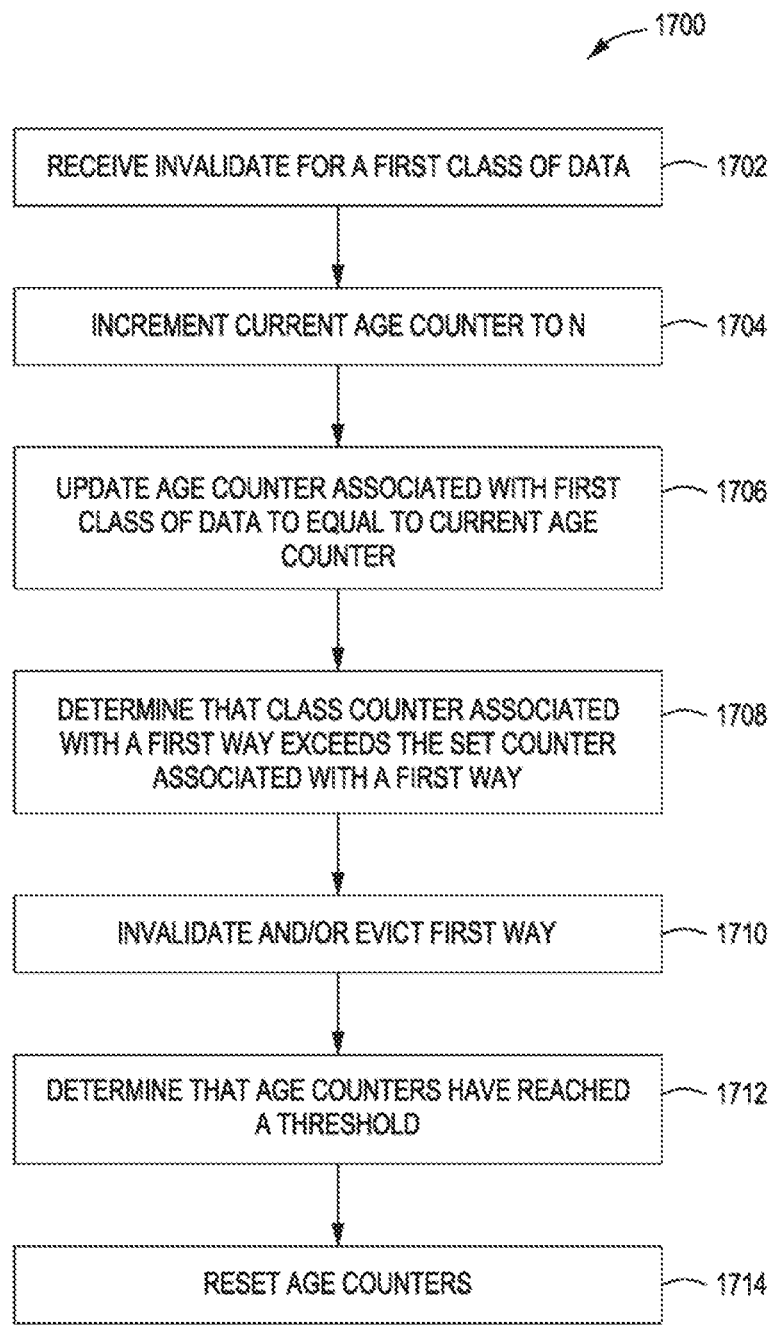

FIG. 2 illustrates, in the context of one example non-limiting embodiment, the life of a T2D packet from Tag Check 2002 until being passed to L1Data (2004a, 2004b, 2004c). The FIG. 2 architecture may be used for the "T2D FIFO 420" block of FIG. 9. The FIG. 9 unified cache 316 processes different types of memory transactions along different data pathways. Unified cache 316 processes shared memory transactions along data pathway 440 with low latency. Unified cache 316 processes non-shared memory transactions via tag pipeline 410. Tag pipeline 410 directs nonshared memory transactions along low latency data pathway 442 when a cache hit occurs, and routes memory transactions through T2D FIFO 420 and data pathway 444 when a cache miss occurs. Unified cache 316 also processes texture-oriented memory transactions received from texture pipeline 428. In the case of either a cache hit or a cache miss, tag pipeline 410 directs texture-oriented memory transactions through T2D FIFO 420 and data pathway 446.

In one embodiment, Local/Global & TTU cache miss traffic and all texture ("TEX") (both cache hit and cache miss) traffic goes through T2D 420, with Local/Global & TTU traffic vs. texture traffic diverging at drain logic blocks 1018(a), 1018(b) and associated separate streaming multi-processor ("SM") interfaces. Meanwhile, Local/Global & TTU cache hits bypass the T2D FIFO and instead pass over the fast path to the SM L1data hit interface.

Figure 4:
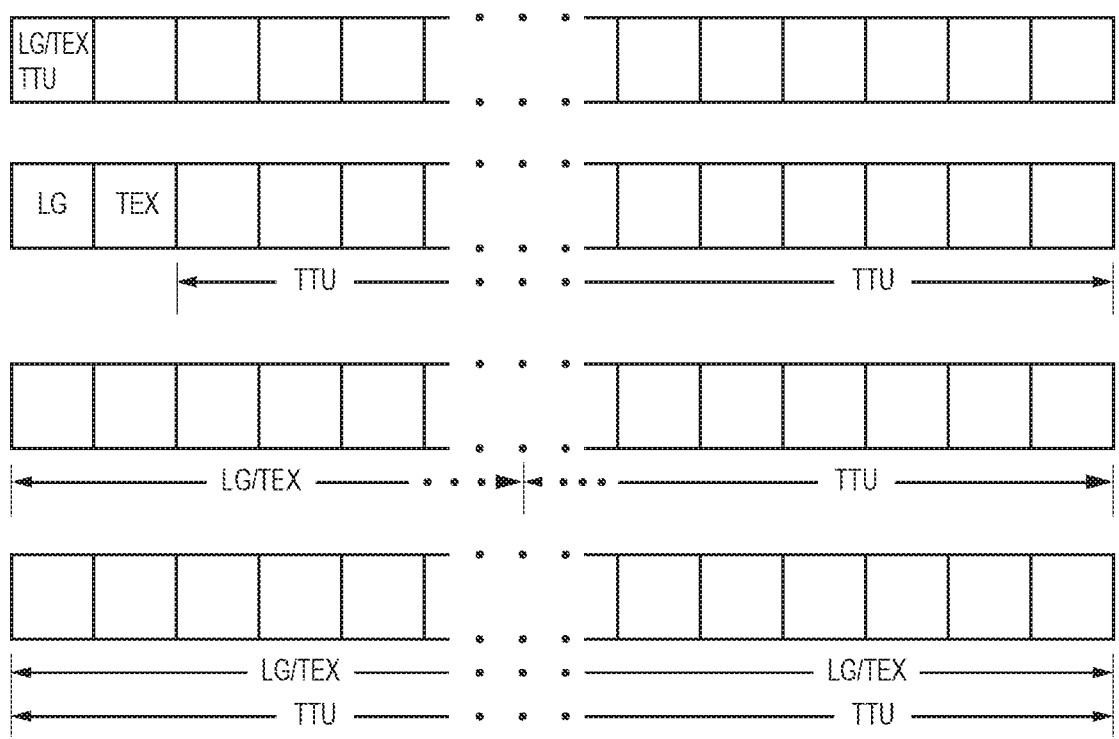
FIG. 4 shows example non-limiting tracking queue mapping modes.

The major stages of the improved FIG. 4 T2D FIFO 420 include:

Tag Check 2002 is the tag referred to in "T2D." This tag check 2002 is similar to what exists in a conventional data cache—in response to a memory access, the tag check determines based on stored tags whether the requested data is present in the cache. If the data is present, the tag check 2002 determines a hit. If the data is not present, the tag check 2002 declares a miss and initiates a memory access to the L2 cache and the rest of the memory subsystem.

See U.S. Pat. No. 10,459,861 of Qiu et al for more detail concerning the "Fast path" around the T2D for Local/Global & TTU hits/stores, which reduces latency for hits that do not need to be serialized.

Queue mapping 2006: The tag check 2002 sends miss traffic to the queue mapping 2006. The queue mapping 2006 determines which tracking queue 2008 an incoming miss request should be mapped to. A dynamically controlled policy is used to determine this mapping (different policy options can be used depending on the type of traffic). The simplest policy would be "all misses from warp 0 go to tracking queue 0, all misses from warp 1 go to tracking queue 1, and so on." In one embodiment, all packets sent to a tracking queue remain in order from the time they are inserted into the tracking queue until they are pushed to the Commit FIFO 442 (see FIG. 9). The out of order is between different tracking queues. In one embodiment, for all Local/Global and texture packets for a single warp will always map to the same tracking queue. In one embodiment, TTU packets are mapped in a round robin fashion across multiple tracking queues.

Tracking queues ("TQs") 2008(0), 2008(1), . . . 2008 (N=47): The tracking queues 2008 hold a dynamic number of packets that have completed Tag check and are waiting to be inserted into the checker picker 2009. In one embodiment, each tracking queue 2008 constitutes a FIFO that maintains a first-in-first-out order of miss traffic the queue mapping 2006 assigns to it.

Checker picker 2009: In one embodiment, for each cycle, the checker picker 2009 chooses one tracking queue 2008 that has valid entries and an empty check slot 2010. It then moves one T2D entry corresponding to a single wavefront from the tracking queue 2008 to the check stage 2010. It populates the check stage 2010 with the dslot and sectors that that entry is still waiting for. Other embodiments can move multiple entries during a cycle.

Check (2010(0), 2010(1), . . . 2010(N=47): operatively connected to the heads of tracking queues 2008(0)-2008(N). The check blocks 2010 store state information concerning what responses tracking queues 2008 are waiting for from the memory system. In one embodiment, the "GNIC Fill Info" information comes from a GNIC interface from the memory system back into the cache. This GNIC interface provides the memory system's response to access requests. FIG. 2 shows a more detailed view of 420 of FIG. 9, and the GNIC fill interface itself (returned from memory) could be shown in FIG. 9 as returning to T2D FIFO 420 rather than M-Stage 426. These responses from the GNIC interface are called "GNIC Fill Info" and in one embodiment are provided one sector per clock. Each time a GNIC fill occurs, the checks 2010 of the heads of each of the tracking queues 2008 are updated to reflect that the filled dslot/sector is now valid in cache and entries should no longer wait for it. Note that the same GNIC fill response from the memory system could potentially satisfy the heads of multiple tracking queues 2008 since a GNIC fill in one embodiment may represent multiple data values comprising a block of data are now available in the cache, and it is also possible that multiple tracking queues could also be waiting on the same data value. Once an entry in the check stage 2010 is no longer waiting on any sectors, it signals that it is ready to be removed from check.

Pop picker: Each cycle, a pop picker chooses one check entry 2010(k) from the pool of ready entries to remove from the check stage 2010 and insert into the checked queue 2012. This "pop" causes values from the check stage 2010 to move to the checked queue 2012. In one embodiment, N entries are moved from the check stage 2010 to the checked queue 2012 per cycle, where N is any positive integer, such that the pop picker chooses which entry or entries to move in the current cycle. Other embodiments could allow multiple or all available entries to move from check stage 2010 to checked queue 2012 per cycle. The pop picker can use round robin or any other more complex picker algorithm to make it pick selection(s). Note: in one embodiment, an entry from tracking queue 2008(1) is inserted into Checked queue 2012(1), an entry from tracking queue 2008(2) is inserted into checked queue 2012(2), and so on.

Checked queue 2012: The checked queue 2012 is a linked list of T2D packets where all of the data referenced by the packets is present in the cache. In one embodiment, entries remain in the checked queue until all of the entries for that instruction or T2D commit group are inserted into the checked queue 2012 and the interlock between the checked queue and state packet queue is satisfied.

Commit picker 2014: Commit pickers 2014 pick a queue. Each cycle, the commit picker 2014 chooses one checked queue that has a ready instruction or T2D commit group and moves those entries from the Checked queue 2012 to the Commit FIFO. In one embodiment, there is a Commit picker 2014(a) for Local/Global and TTU traffic and a Commit picker 2014(b) for texture traffic. In one embodiment, the commit picker 2014 ensures that the interlock between a fast(er) path and a slow(er) path is honored. The commit picker 2014 can use round robin or any other more complex picker algorithm. Once a queue has been picked, the deallocation of the resources used by the deallocation of the head entry on that queue is independent of the picker itself.

Commit FIFO 2016: The commit FIFO is the final ordering of packets that are then drained to L1Data and the SM memory interfaces via drain logic 2018. In one embodiment, K checked queue 2012 values is/are moved to the drain logic 2018 per cycle where K is any positive integer, but other arrangements are possible.

Drain logic 2018 cycles through the committed values and sends the associated L1 data back to the appropriate SM interface (in this embodiment, one drain logic 2018(*a*) is shared between Local/Global and TTU traffic to send such traffic back to the Local/Global & TTU interface of the SM, and a second drain logic 2018(*b*) is used for sending texture traffic back to the SM's texture traffic interface).

FIG. 2 is a logical view. The Tracking Queue 2008 and Checked Queue 2012 need not be physical FIFOs with a fixed size(s). Rather, they may comprise a dynamically sized linked list of pointers into the T2D.

Figure 3:
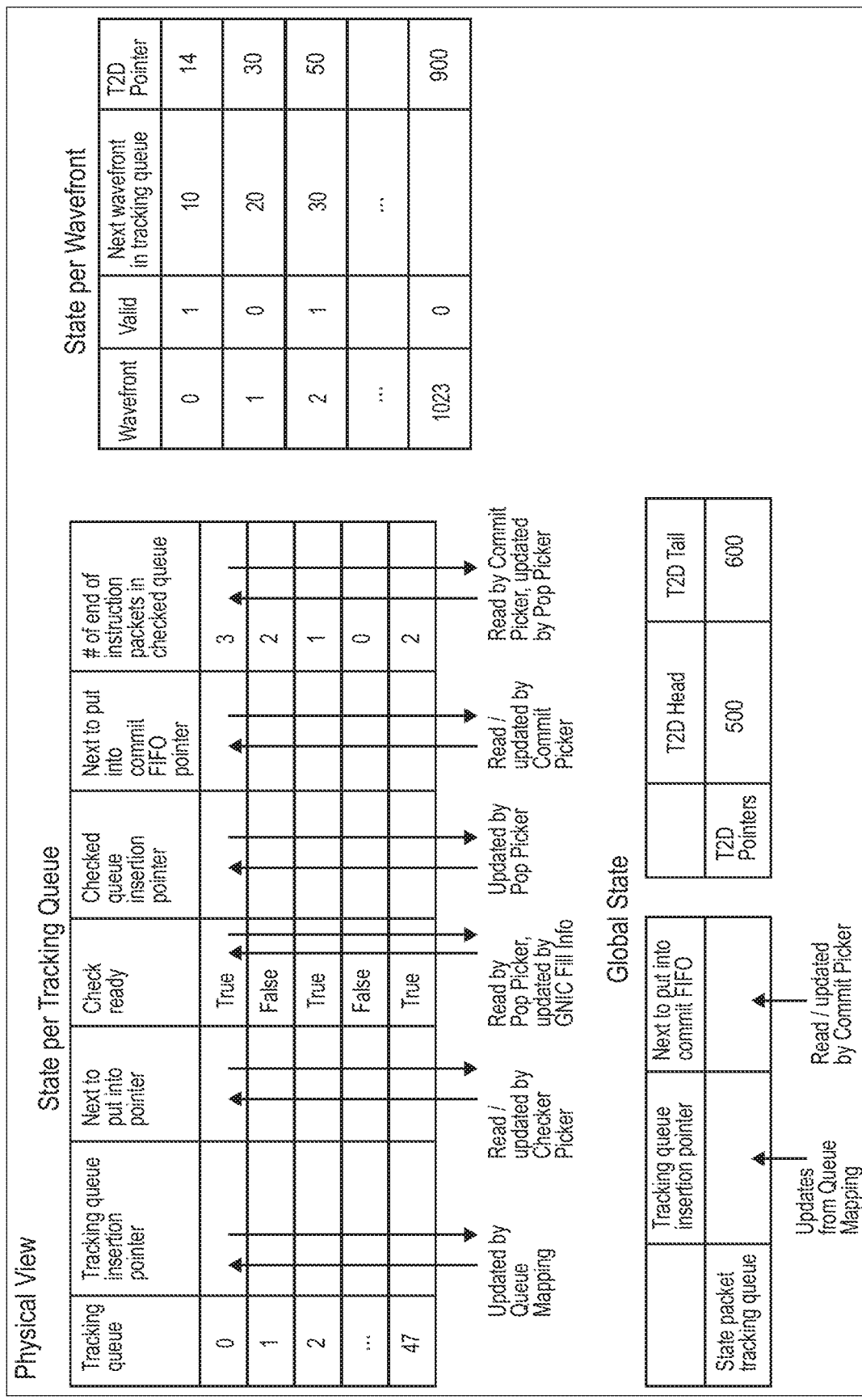
FIG. 3 shows an example physical view of the FIG. 2 embodiment of a memory request tracking structure for a streaming cache.

FIG. 3 shows an example non-limiting physical view including new pointers that are being added to the design and which parts of the control logic operate on which sets of tracking pointers. The structures shown in FIG. 3 represent different physical storage structures used for the tracking. There is thus the stage per tracking queue table; a state per wavefront table; and global state information.

In one embodiment, the state per tracking queue table may store, by tracking queue number, the current tracking queue insertion pointer; the next to put into the pointer; a check ready flag; a checked queue insertion pointer; a next to put into commit FIFO pointer; and the number of the end of instruction packets in the checked queue.

In one embodiment, the state per wavefront table may store the wavefront number; a valid bit; an identifier of a next wavefront in the tracking queue; and a T2D pointer into the prior T2D FIFO. In one embodiment, this table is typically written in order and cannot be reclaimed until the last wavefront in the table has finished processing misses. In other embodiments, such a table could be accessed randomly or otherwise out of order with associated potential increase in complexity.

In one embodiment, this global state table is used to keep track of state information for global ordering events (which are global across all tracking queues) that flow through the cache. The Global state table may include two sub tables. The first table may comprise a state packet tracking queue pointer associated with a tracking queue insertion pointer and a next to put into commit FIFO; and a T2D pointers table providing T2D head and T2D tail.

Mapping to Tracking Queues

Mode #1 (top diagram in FIG. 4) maps all packets to tracking queue 0, providing no out-of-order miss tracking at all, thus emulating a prior design. This can be employed for various reasons such as in the case of potential bugs.

Mode #2 (next diagram down in FIG. 4) provides in-order for Local/Global and texture traffic to traffic queue 0, and out of order miss tracking for TTU packets. Once again, this mode can be employed for various reasons such as in the case of potential bugs.

Mode #3 (third FIG. 4 diagram) can be used as a fallback in the case where we have unexpected interference between Local/Global and texture traffic and TTU traffic. Mode 3 provides mapping to separate tracking queues based on warp number, and TTU packets are mapped round robin across remaining queues.

Mode #4 (bottom FIG. 4 diagram) is expected to be the most flexible and offer the highest performance. It provides for each warp to have its own tracking queue for Local/Global and texture packets, and maps TTU traffic round robin across all tracking queues (since TTU traffic has no in-order requirements, it does not need to be serviced in order).

The four modes described above are non-limiting examples; many other mappings are possible.

Checker Picker 2009

The checker picker 2009 and the checker pipeline are designed to process wavefronts which are enqueued in the tracking queues (TQs) 2008 (excluding the state packet queue 2020 and evict long queue) and deliver these wavefronts to check stage 2010. In one embodiment, the checker pipeline (after the pick) itself is two pipeline stages deep. Due to this pipeline depth, the checker picker 2009 in one embodiment cannot know when it picks a given wavefront if it is safe to pick from the same TQ 2008 again the next cycle, since the first wavefront may stall in check stage 2010 due to a miss. This limitation leads in one embodiment to the design having two different and competing missions: 1) to maximize performance 2) to minimize wasted effort. In this way, the checker picker 2009 design in one embodiment has been implemented as a collection of algorithms designed to try and balance these missions. In one embodiment, the checker picker 2009 pipeline can make a picker selection based on a combination of a number of different, independent criteria.

After selection, the chosen wavefront enters the checker pipeline. In the first cycle of this pipeline (CP2 in the RTL), the WAVE and CHKLINK RAMs are read using the wave_id of a wavefront stored in the FIG. 3 state per wavefront table. In one embodiment, the WAVE RAM read delivers the information necessary to determine hit or miss for the wavefront (its dslots & half_sector_mask) and the CHKLINK RAM provides the information necessary to update the TQ check head pointers. In the second cycle of the checker pipeline (CP3 in the RTL), the tag banks are indexed by the dslot(s) and produce hit/miss information that is combined with the half_sector_masks read from the WAVE ram. This hit/miss information is then delivered to check stage 2010. In addition, the TQ check pointer is updated from CP3 for use by the age arbiter.

Check Stage 2010

Figure 5:
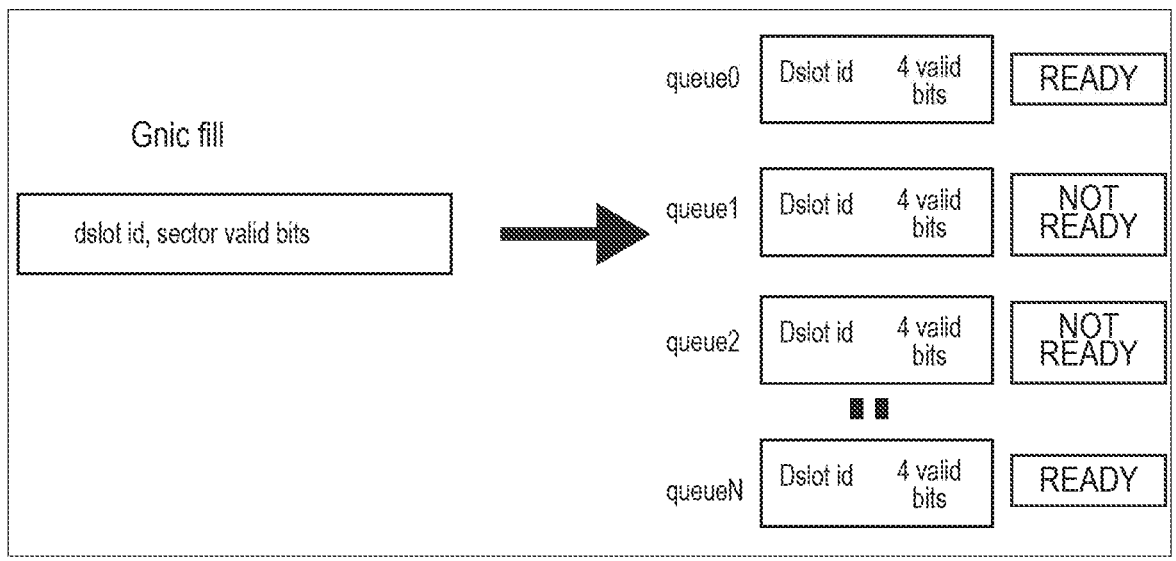
FIG. 5 shows example tracking structure entry population in one embodiment.
Figure 6:
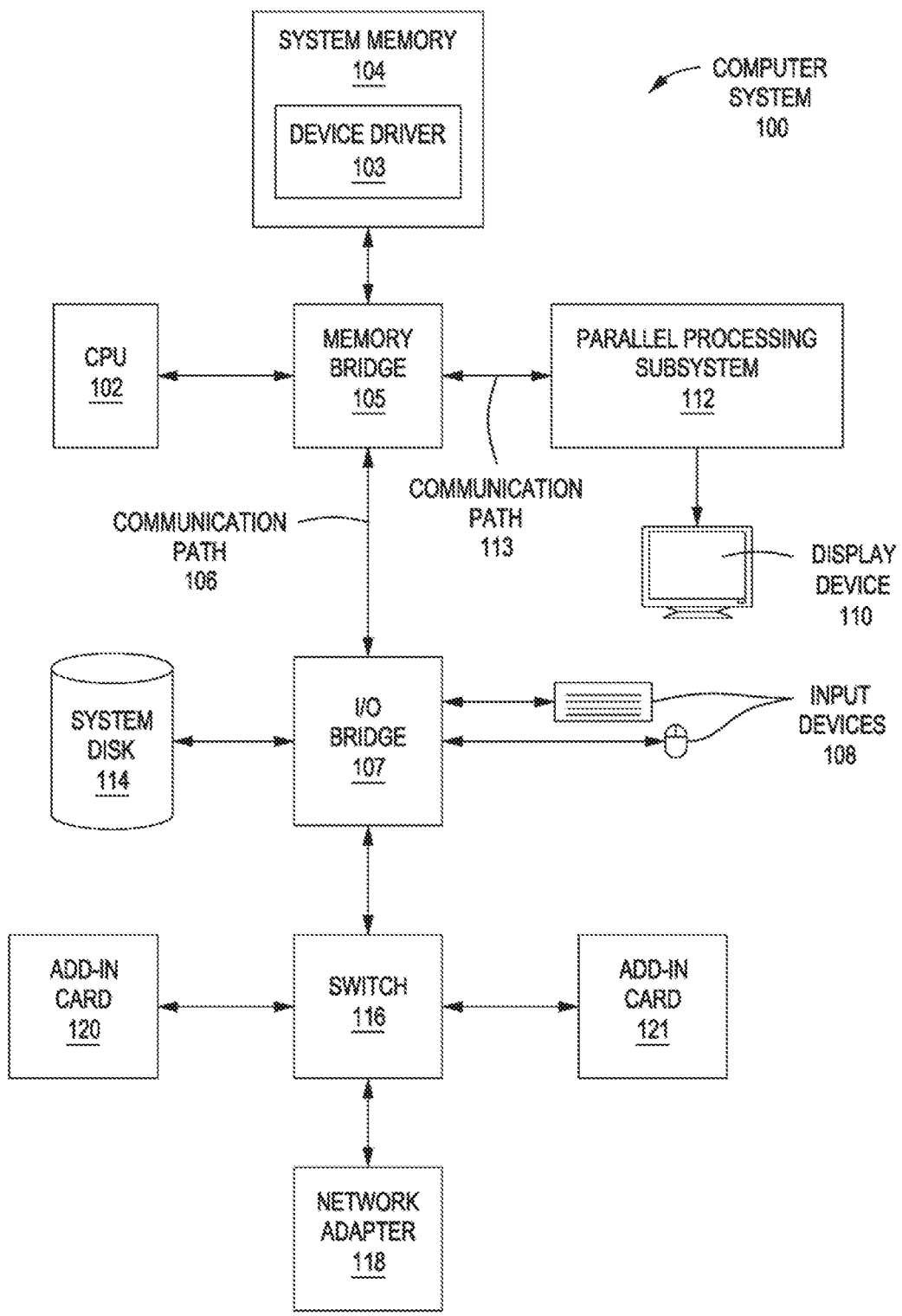
Figure 7:
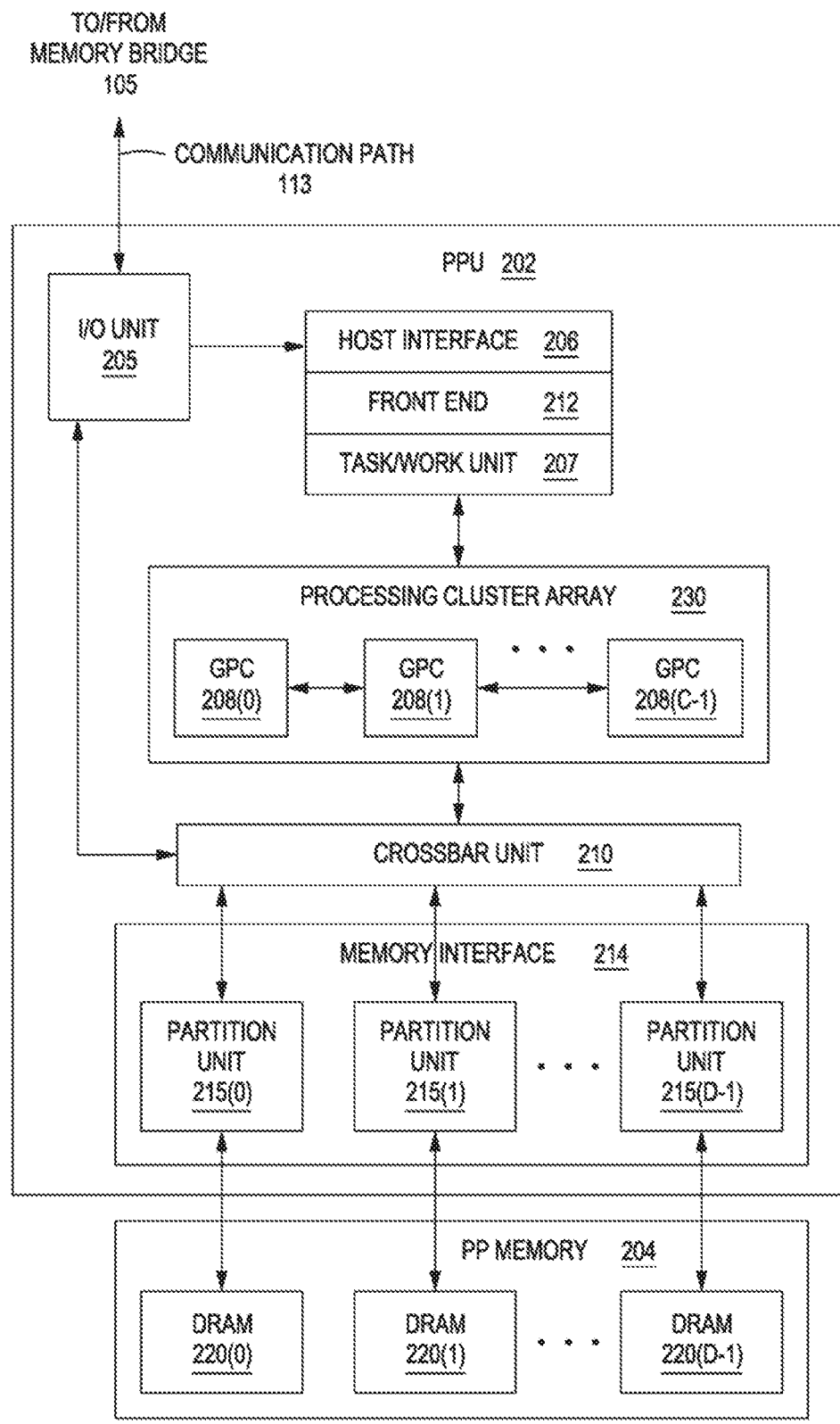
Figure 8A:
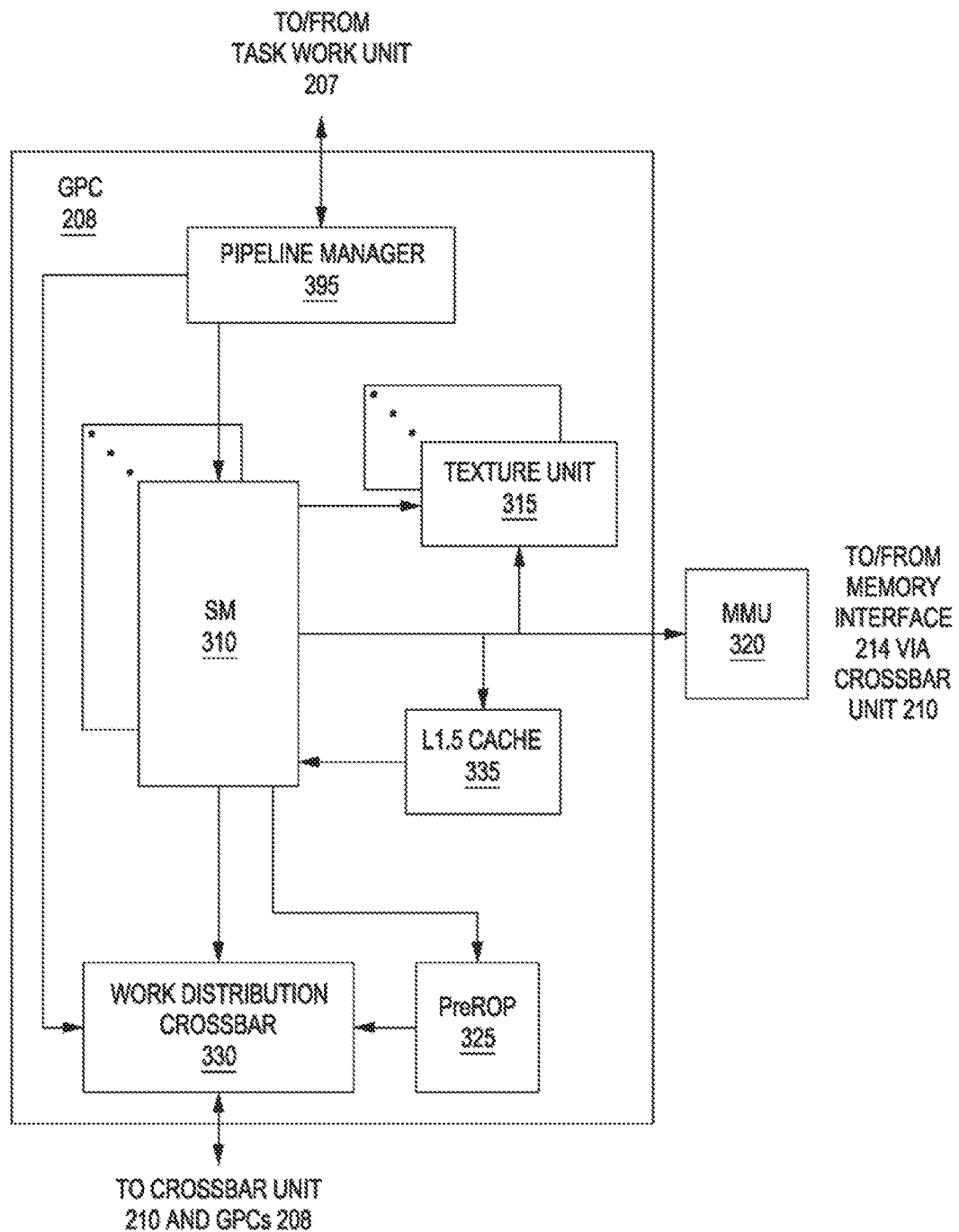
Figure 8B:
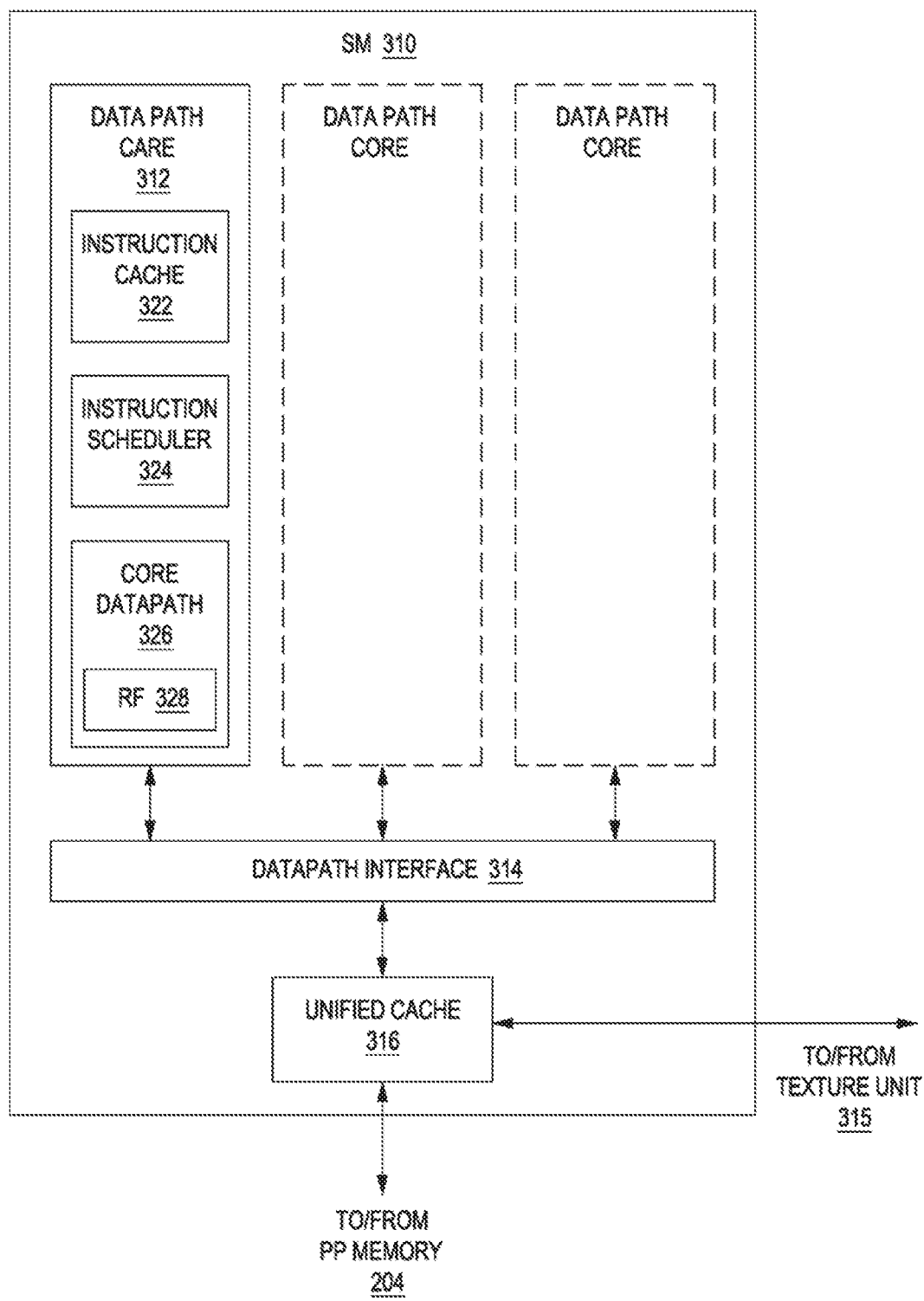

In order to provide the ability to check the head entry of all tracking queues, we introduce a new tracking structure shown in FIG. 5. In one embodiment, there is one tracking structure per tag bank and there are multiple (e.g., four) tag banks. The tracking structure stores the dslot ID and the sectors that are still needed for the head entry in each tracking queue 2008. To populate the check stage 2010 in one embodiment, it is helpful to know all of the dslots that the T2D entry needs along with which sectors in each of those dslots are needed. The overall strategy is: 1) each request is checked once, at the time it goes through the checker-picker. At that time, it records which of the dslot id's & sectors that it requires are already present, and which are still missing. From there, it sits in this tracking structure in FIG. 5 until all the remaining dslot ids and sectors are ready. For a given request, there's two ways it can be marked ready: either it was ready when it went through "check" (when it was picked by the checker picker), or it sat in the FIG. 5 tracking structure until it saw that dslot/sector filled from the GNIC. The tracking structure is only tracking updates based on GNIC fills so the hardware in one embodiment makes sure that the valid bits are updated to reflect the current cache state at the time of insertion. This may involve adding bypasses to cover 1 or 2 cycles between when the sector valid state is read from the cache and when the tracking structure is populated and begins receiving GNIC fill updates. This ensures that no GNIC fills are lost during the time between when the cache state is queried and the time the entry is populated.

On every GNIC fill, the hardware in one embodiment does a match in the tracking structure corresponding to the tag bank of the dslot ID and then updates the valid bits for matching dslot ids. When all 4 sector valid bits in each of the 4 different entries (for the different tag banks) are valid, then the hardware declares that tracking queue 2008 as ready and can move the entry out of the memory and fill the memory with the next entry in that tracking queue. This is detailed in FIG. 5, which shows "Ready" and "Not Ready" states for different TQs 2008.

Commit Picker 2014/Respecting Instruction Boundaries

For Local/Global and Texture/Surface operations, a single instruction can generate multiple T2D entries. In one embodiment, all of these entries from a single instruction are to stay together in the pipe. Specifically, in one embodiment, TEX dstage/fstage expects to work on all of the entries for an entire quad before switching to a different quad.

In one embodiment, entries remain in the checked queue 2012 until the last entry for that instruction arrives. Once all entries for an instruction are in the checked queue 2012, then the hardware moves them all into the commit FIFO 2016. There is a separate commit FIFO 2016(a) for Local/Global and TTU requests and another separate commit FIFO 2016 (b) for texture requests. In one embodiment, the commit FIFO 2016 has a small fixed capacity and serves to buffer requests between L1Tag and L1Data.

L1Data pops entries from the commit FIFOs and performs the data reads. The entries in the T2D are then marked as invalid.

Once invalid entries become the oldest (by reaching the head of the T2D FIFO), their storage is reclaimed and can be reallocated for new entries. This is referred to as in-order allocation/deallocation.

State Packets

In one embodiment, state packets are sent down the texture pipe and contain information about texture header/samplers. In one embodiment, some of this state is used in dstage/fstage. In prior in order T2D designs, state packets were sent as packets through the T2D ensuring ordering relative to the texture instructions that need this state. In one embodiment providing out of order processing, the amount of out-of-order (OOO) is restricted so that state packets remain in program order relative to the texture requests that reference them.

To ensure the proper ordering, one embodiment adds an additional tracking queue 2020 ("State Packet queue") dedicated to holding state packets. Then, when the hardware decides whether entries are eligible to be moved from the Checked Queue 2012 to the commit queue 2016, it compares the ages of the state packets with the ages of the entries in the checked queue. In one embodiment, only Texture/Surface have to respect ordering relative to state packets; Local/Global and TTU may ignore this state packet age test. Example non-limiting features in one embodiment are:

Local/Global and TTU packets don't compare age with state packet queue

Entries in state packet queue are only eligible to move to commit queue 2016 if they are older than all other entries)

A Texture/Surface operation is eligible to move to commit FIFO if it is older than head of state packet queue (or if state packet queue is empty)

It is also possible that L1Tag 2002 receives a state packet in between wavefronts that belong to the same instruction. To handle that case, the hardware in one embodiment relies on the T2D commit group concept with the following extension:

When a state packet arrives in L1Tag, if L1Tag is currently in the middle of processing an instruction it sets the end of T2D commit group flag on the last wavefront it populated in the "state per wavefront" wavefront storage table shown in FIG. 3.

By setting the end of T2D commit group flag, the system guarantees that all wavefronts before the state packet will be removed from T2D before the state packet is processed.

Handling Instructions that Generate a Large Number of Wavefronts

Some texture instructions can generate thousands of T2D entries for a single texture instruction. Therefore, if the system waited until the last entry arrived, there could be a deadlock situation. To handle these events, one embodiment introduces an extra bit to signify that a packet is the last packet in a T2D commit group. When L1Tag 2002 is sending requests to the tracking queues 2008, it counts how many packets have been sent for the current instruction. In one embodiment, a programmable dynamic runtime decision value controls the maximum number of wavefronts in a T2D commit group. The default value for this dynamic runtime decision value in one embodiment can be 32. Each time more than a certain number (e.g., 32) T2D packets are generated, the last (e.g., $32^{nd}$) packet is marked as "end of T2D commit group". Once a queue that has this end of T2D commit group flag set starts draining, no other queue can drain until the end of instruction flag is seen for the selected queue. This end-of-T2D commit group flag is used when deciding if an entry can be moved from checked queue 2012 to commit FIFO 2016 in one embodiment.

In one embodiment, an entry is eligible to be moved from checked queue 2012 to commit FIFO 2016 if:

All entries for an instruction are in the checked queue 2012, meaning a packet with the end of instruction flag set has arrived in the checked queue.

The state packet age check is satisfied.

All entries in a T2D commit group are in the checked queue 2012, meaning a packet with the end of T2D commit group flag set has arrived in the checked queue. In one embodiment, it is only valid to move these packets from the checked queue 2012 to the commit queue if the first packet for this T2D commit group is the oldest packet across all 48 tracking queues. This is done in one embodiment by comparing the packet's T2D placement with the T2D tail pointer. (This approach works because in order allocation/deallocation of the T2D is performed).

Interlock Between Fast and Slow Path

One embodiment guarantees that items inserted into the T2D (slow path) after an item is inserted into the fast path (see FIG. 2) will always reach L1Data after the item from the fast path, i.e. the slow path is always slower than the fast path. This guarantee is functional in one embodiment to guarantee the correct values are returned. For example, in one embodiment if the system executes a surface store (SUST) followed by a surface load (SULD) to the same address, the SULD needs to return the data written by the SUST. Since the SUST takes the fast path and the SULD takes the slow path, if the slow path is faster than the fast path the SULD could read the stale data rather than the data from the SUST.

A guarantee was previously made by an interlock between the slow and fast path. When an entry was pushed on the fast path, it takes a snapshot of the T2D tail pointer and CBUF age. Then the following rules would be honored:

always able to process an entry from the fast path can only pop an entry from the slow path if its T2D pointer differs from the snapped T2D pointer stored by the head entry in the fast path.

If the above two rules are honored, then the fast path will always be faster than the slow path with an in-order T2D.

The above scheme can be extended with out of order T2D assuming in order allocation/deallocation. When an entry is pushed on the fast path, it records the T2D tail pointer (this is the tail pointer used for in order allocation/deallocation). Then the following rules can be honored in one embodiment:
always able to processes an entry from the fast path
can only process an entry from the slow path if its T2D pointer is older than the snapped T2D pointer stored by the head entry in the fast path.

In some embodiments, the above rules are sufficient to guarantee that the fast path is always faster than the slow path with out of order T2D.

One embodiment provides the following two possible options for implementing the comparison test above:
Option 1: The commit picker 2014 is only eligible to choose a checked queue 2012 if the instruction or T2D commit group passes the comparison between the T2D pointer and snapped pointer in fast path. This would use one comparator per checked queue but would have the highest performance.
Option 2: Once the commit picker 2014 chooses a checked queue 2012 that satisfies the three conditions that dictate when entries can be moved from the checked queue to the commit queue 2016, it then compares the T2D pointer with the snapped T2D pointer from the fast path. This would only need one comparator. If the comparison fails, then no entries are moved to the commit queue that cycle and the next cycle the commit picker chooses a different checked queue. In one embodiment, it is not sufficient for the commit picker 2014 to stall until the comparison with the fast path snapped T2D pointer becomes valid.

Reference Counter Clear Tokens

In one embodiment, each dslot contains a reference counter that counts the number of inflight references in the T2D to that dslot. When a wavefront is pushed into the T2D, this reference counter is incremented. In one embodiment, references in the fast path do not manipulate these counters. When the dslot is read in L1Data, the reference counter is decremented. In one embodiment, only dslots with refcounters equal to 0 are eligible to be reassigned to a different tag. The width of the reference counter determines the number of inflight requests that can exist to a single dslot. When more than this number of inflight references occur, the refcounter saturates and remains at the maximum value. A saturated reference count cannot be decremented in one embodiment. When the tag for a dslot that has a saturated reference counter is invalidated from L1Tag, a special refcount flush token ("RCFT") is pushed into T2D. When this token reaches the head of the T2D, it is guaranteed that there are no more inflight references to this data line and the dslot can be reallocated to a different tag.

The RCFT can create a problem for out of order T2D since the RCFT relies on the fact that the T2D is in order. The scheme used for state packets can be extended to handle RCFT. In one embodiment, a similar mechanism for RFCT is used compared with state packets with slightly different ordering requirements specific to the ordering requirements of RFCT. With this scheme, the performance impact of ordering requests to respect RFCT ordering requirements is negligible.

The technology herein in one embodiment increases GPU level performance across a suite of workloads deemed to be important. Realizable performance increases depend on the nature of the workload—some individual "buckets" (groupings of processing such as graphics processing) see much higher performance improvements. The execution system becomes more efficient as well since threads or warps whose memory request have already been satisfied can access the streaming cache and proceed with execution instead of waiting for another thread or warp at the head of the queue.

All patents and publications cited above are incorporated herein by reference.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A memory request tracking circuit for use with a streaming cache memory configured to receive memory requests for data in a memory system and return memory system data in response to the received memory requests, the memory request tracking circuit comprising:
a tag check configured to detect misses of the streaming cache memory;
plural tracking queues each configured to maintain miss traffic in first-in-first-out order; and
a queue mapper coupled to the tag check and the plural tracking queues, the queue mapper being configured to provide plural memory request tracking information entries for miss traffic to the plural tracking queues to enable in-order and out-of-order memory request returns, the queue mapper being configured to distribute a first subset of the plural memory request tracking information entries to the same tracking queue to enable in-order memory request returns for the first subset and to distribute a second subset of the plural memory request tracking information entries across plural tracking queues to enable out-of-order memory request returns for the second subset,
wherein the queue mapper is configured to distribute the out-of-order memory request returns across plural tracking queues to reduce the chance that any individual long-latency access will block a number of other accesses, thereby enabling a consuming ray tracer to make forward progress when individual long-latency accesses occur.

2. The memory request tracking circuit of claim 1 wherein the queue mapper is programmable to preserve in-order memory request return handling for a first type of memory requests and to enable out-of-order memory request return handling for a second type of memory requests different from the first type of memory requests.

3. The memory request tracking circuit of claim 2 wherein the first type of memory requests and the second type of memory requests are selected from the group consisting of loads from local or global memory; texture memory/storage; and acceleration data structure storage.

4. The memory request tracking circuit of claim 1 wherein the plural tracking queues comprise first through N tracking queues, and the queue mapper allocates a first tracking queue to a particular warp and distributes tracking information for out-of-order memory requests evenly across second through N tracking queues.

5. The memory request tracking circuit of claim 1 wherein the plural tracking queues each comprise a first-in-first-out storage.

6. The memory request tracking circuit of claim 1 further including a pipelined checker picker that selects tracking queue outputs for application to a check in response to cache miss fill indications, the pipelined checker picker being dynamically configured to perform the selection.

7. The memory request tracking circuit of claim 6 wherein the check comprises tracking structures that indicate memory system return data needed by the head of each tracking queue and are configured to track when the memory system has returned all sectors needed by the head of each tracking queue.

8. The memory request tracking circuit of claim 7 wherein the checks are configured to provide plural sector valid bits for each of plural tag banks.

9. The memory request tracking circuit of claim 1 further including a first commit picker configured to process a first traffic type.

10. The memory request tracking circuit of claim 9 further including a second commit picker configured to process a second traffic type different from the first traffic type.

11. The memory request tracking circuit of claim 1 configured to provide a first mode that provides in-order allocation and deallocation of tracking resources and a second mode that provides out-of-order allocation and deallocation of tracking resources.

12. The memory request tracking circuit of claim 1 further including a state packet queue configured to hold state packets and further configured to restrict out-of-order state packet processing so state packets remain in program order relative to memory access requests that reference the state packets.

13. The memory request tracking circuit of claim 1 further including an indicator encoder that encodes an indicator of a last packet in a commit group.

14. The memory request tracking circuit of claim 13 further including a commit picker configured to selecting tracked memory request entries for moving to a commit queue in response to the indicator indicating that all memory request entries in a commit group have been serviced and are in the cache.

15. The memory request tracking circuit of claim 1 further including:
 first and second traffic paths, wherein the first path bypasses the plural tracking queues and the second path is through at least one of the plural tracking queues; and
 an interlock circuit that guarantees the first path is always faster than the second path.

16. The memory request tracking circuit of claim 15 wherein the interlock circuit includes a comparator configured to compare the age of traffic in the fast path with the age of traffic in the slow path.

17. The memory request tracking circuit of claim 1 further including reference counters that count a number of inflight references to a memory slot, reference counter outputs and/or operations being configured to adapt to out of order processing.

18. A streaming cache configured to receive memory requests for data in a memory system and return memory system data in response to the received memory requests, the streaming cache comprising:
 a tag pipeline including a coalescer, a tag memory and a tag processor, the tag pipeline detecting cache misses;
 a commit FIFO;
 an evict FIFO;
 an out-of-order memory request tracking circuit comprising plural tracking queues each configured to maintain miss traffic in first-in-first-out order, the out-of-order memory request tracking circuit configured to distribute queueing of memory request tracking entries for out-of-order memory requests across to different tracking queues and to distributing queuing of memory request tracking entries for in-order memory requests to the same tracking queue; and
 a pipelined picker circuit connected to the plural tracking queues, the pipelined picker circuit configured to pick between multiple ones of the plural tracking queues having ready returns and enqueuing a picked ready return in a further first-in-first-out queue for delivery to a requester.

19. The streaming cache of claim 18 further including a queue mapper coupled to the tag pipeline and the plural tracking queues, the queue mapper being configured to distribute a first subset of plural request tracking entries across the plural tracking queues to selectively enable out-of-order memory request returns for the first subset and to enqueue a second subset of the plural request tracking information entries on the same tracking queue to enable in-order memory request returns for the second subset, wherein each of the plural tracking queues is capable of holding any of the plural memory request tracking information entries.

20. A memory request tracking method for use with a streaming cache memory configured to receive memory requests for data in a memory system and return memory system data in response to the received memory requests, the memory request tracking method comprising:
 detecting cache misses;
 providing plural tracking queues each configured to maintain miss traffic in first-in-first-out order; and
 distributing request tracking information entries for miss traffic to the plural tracking queues to support either in-order and out-of-order memory request returns including distributing queueing for out-of-order memory requests across different tracking queues and distributing queueing for in-order memory requests to the same tracking queue,
 wherein the distributing includes distributing queuing for the out-of-order memory request returns across plural tracking queues to reduce the chance that any individual long-latency access will block a number of other accesses, thereby enabling a consuming ray tracer to make forward progress when individual long-latency accesses occur.

21. The memory request tracking method of claim 20 further including programming a queue mapper to preserve in-order memory request return handling for a first type of memory requests and to enable out-of-order memory request return handling for a second type of memory requests different from the first type of memory requests.

22. The memory request tracking circuit of claim 21 wherein the first type of memory requests and the second type of memory requests are each selected from the group consisting of local or global memory load requests, texture memory requests, surface memory requests, and acceleration data structure memory requests.

23. The memory request tracking circuit of claim 20 wherein the plural tracking queues comprise first through N tracking queues, and distributing includes allocating a first tracking queue to a particular warp and distributing request tracking information for out of order memory requests evenly across second through N tracking queues.

24. The memory request tracking circuit of claim 20 wherein the plural tracking queues each comprise a first-in-first-out storage.

25. The memory request tracking circuit of claim 20 further including selecting tracking queue outputs for application to a check in response to cache miss fill indications.

26. The memory request tracking circuit of claim 25 further comprising using tracking structures to indicate memory system return data needed by the head of each tracking queue and tracking when the memory system has returned all sectors needed by the head of each tracking queue.

27. The memory request tracking circuit of claim 26 further including providing plural sector valid bits for each of plural tag banks.

28. The memory request tracking circuit of claim 20 further including configuring a first commit picker to process a first traffic type.

29. The memory request tracking circuit of claim 28 further including configuring a second commit picker process a second traffic type different from the first traffic type.

30. The memory request tracking circuit of claim 20 further including providing both in-order and out-of-order allocation and deallocation of tracking resources.

31. The memory request tracking circuit of claim 20 further including configuring a state packet queue to hold state packets, and restricting out-of-order state packet processing so state packets remain in program order relative to memory access requests that reference the state packets.

32. The memory request tracking circuit of claim 20 further including encoding an indicator of a last packet in a commit group.

33. The memory request tracking circuit of claim 32 further including selecting tracked memory request entries for moving to a commit queue in response to the indicator indicating that all memory request entries in a commit group have been serviced and are in the cache.

34. The memory request tracking circuit of claim 20 further including:
  using a first traffic path to bypass the plural tracking queues;
  using a second traffic path through at least one of the plural tracking queues; and
  guaranteeing the first path is always faster than the second path.

35. The memory request tracking circuit of claim 34 further including comparing the age of traffic in the fast path with the age of traffic in the slow path.

36. The memory request tracking circuit of claim 20 further including counting a number of inflight references to a memory slot, reference counter outputs and/or operations being configured to adapt to out of order processing.

* * * * *